(12) United States Patent
Vorbach et al.

(10) Patent No.: US 8,312,301 B2
(45) Date of Patent: Nov. 13, 2012

(54) METHODS AND DEVICES FOR TREATING AND PROCESSING DATA

(76) Inventors: Martin Vorbach, München (DE); Volker Baumgarte, München (DE)

( * ) Notice: Subject to any disclaimer, the term of this patent is extended or adjusted under 35 U.S.C. 154(b) by 292 days.

(21) Appl. No.: 12/570,984

(22) Filed: Sep. 30, 2009

(65) Prior Publication Data

US 2010/0023796 A1    Jan. 28, 2010

Related U.S. Application Data

(60) Continuation of application No. 12/257,075, filed on Oct. 23, 2008, now Pat. No. 8,099,618, which is a division of application No. 10/469,909, filed as application No. PCT/EP02/02402 on Mar. 5, 2002, now Pat. No. 7,444,531.

(30) Foreign Application Priority Data

| Mar. 5, 2001 | (DE) | 101 10 530 |
|---|---|---|
| Mar. 7, 2001 | (DE) | 101 11 014 |
| Jun. 20, 2001 | (DE) | 101 29 237 |
| Jul. 24, 2001 | (DE) | 101 35 210 |
| Jul. 24, 2001 | (DE) | 101 35 211 |
| Aug. 16, 2001 | (DE) | 101 39 170 |
| Aug. 29, 2001 | (DE) | 101 42 231 |
| Sep. 3, 2001 | (DE) | 101 42 894 |
| Sep. 3, 2001 | (DE) | 101 42 903 |
| Sep. 3, 2001 | (DE) | 101 42 904 |
| Sep. 11, 2001 | (DE) | 101 44 732 |
| Sep. 11, 2001 | (DE) | 101 44 733 |
| Sep. 17, 2001 | (DE) | 101 45 792 |
| Sep. 17, 2001 | (DE) | 101 45 795 |
| Sep. 19, 2001 | (DE) | 101 46 132 |
| Nov. 5, 2001 | (DE) | 101 54 259 |
| Nov. 5, 2001 | (DE) | 101 54 260 |
| Jan. 19, 2002 | (DE) | 102 02 044 |
| Jan. 20, 2002 | (DE) | 102 02 175 |
| Feb. 15, 2002 | (DE) | 102 06 653 |

(51) Int. Cl.
*G06F 1/32* (2006.01)

(52) U.S. Cl. ........ 713/300; 713/310; 713/320; 713/321; 713/322; 713/324; 713/330; 713/340

(58) Field of Classification Search .................. 713/300, 713/310, 320–324, 330, 340
See application file for complete search history.

(56) References Cited

U.S. PATENT DOCUMENTS 3,564,506 A    2/1971    Bee et al.
(Continued)

FOREIGN PATENT DOCUMENTS

DE    42 21 278    1/1994
(Continued)

OTHER PUBLICATIONS

Microsoft Press Computer Dictionary, Third Edition, Redmond, WA, 1997, 3 pages.

(Continued)

*Primary Examiner* — M Elamin
(74) *Attorney, Agent, or Firm* — Kenyon & Kenyon LLP

(57) ABSTRACT

A data processing unit having a field of clocked logic cells (PAEs) which is operable in different configuration states and a clock preselecting means for preselecting logic cell clocking. The clock preselecting means is designed in such a way that, depending on the state, a first clock is preselected at least at a first cell (PAE) and an additional clock is preselected at least at an additional cell.

44 Claims, 7 Drawing Sheets

U.S. PATENT DOCUMENTS

| | | | |
|---|---|---|---|
| 3,681,578 A | 8/1972 | Stevens | |
| 3,753,008 A | 8/1973 | Guarnaschelli | |
| 3,754,211 A | 8/1973 | Rocher et al. | |
| 3,855,577 A | 12/1974 | Vandierendonck | |
| 3,956,589 A | 5/1976 | Weathers et al. | |
| 4,151,611 A | 4/1979 | Sugawara et al. | |
| 4,233,667 A | 11/1980 | Devine et al. | |
| 4,414,547 A | 11/1983 | Knapp et al. | |
| 4,498,134 A | 2/1985 | Hansen et al. | |
| 4,498,172 A | 2/1985 | Bhavsar | |
| 4,566,102 A | 1/1986 | Hefner | |
| 4,571,736 A | 2/1986 | Agrawal et al. | |
| 4,590,583 A | 5/1986 | Miller | |
| 4,591,979 A | 5/1986 | Iwashita | |
| 4,594,682 A | 6/1986 | Drimak | |
| 4,623,997 A | 11/1986 | Tulpule | |
| 4,646,300 A | 2/1987 | Goodman et al. | |
| 4,663,706 A | 5/1987 | Allen et al. | |
| 4,667,190 A | 5/1987 | Fant et al. | |
| 4,682,284 A | 7/1987 | Schrofer | |
| 4,686,386 A | 8/1987 | Tadao | |
| 4,706,216 A | 11/1987 | Carter | |
| 4,720,778 A | 1/1988 | Hall et al. | |
| 4,720,780 A | 1/1988 | Dolecek | |
| 4,739,474 A | 4/1988 | Holsztynski | |
| 4,760,525 A | 7/1988 | Webb | |
| 4,761,755 A | 8/1988 | Ardini et al. | |
| 4,791,603 A | 12/1988 | Henry | |
| 4,811,214 A | 3/1989 | Nosenchuck et al. | |
| 4,852,043 A | 7/1989 | Guest | |
| 4,852,048 A | 7/1989 | Morton | |
| 4,860,201 A | 8/1989 | Stolfo et al. | |
| 4,870,302 A | 9/1989 | Freeman | |
| 4,873,666 A | 10/1989 | Lefebvre et al. | |
| 4,882,687 A | 11/1989 | Gordon | |
| 4,884,231 A | 11/1989 | Mor et al. | |
| 4,891,810 A | 1/1990 | de Corlieu et al. | |
| 4,901,268 A | 2/1990 | Judd | |
| 4,910,665 A | 3/1990 | Mattheyses et al. | |
| 4,918,440 A | 4/1990 | Furtek et al. | |
| 4,939,641 A | 7/1990 | Schwartz et al. | |
| 4,959,781 A | 9/1990 | Rubinstein et al. | |
| 4,967,340 A | 10/1990 | Dawes | |
| 4,972,314 A | 11/1990 | Getzinger et al. | |
| 4,992,933 A | 2/1991 | Taylor | |
| 5,010,401 A | 4/1991 | Murakami et al. | |
| 5,014,193 A | 5/1991 | Garner et al. | |
| 5,015,884 A | 5/1991 | Agrawal et al. | |
| 5,021,947 A | 6/1991 | Campbell et al. | |
| 5,023,775 A | 6/1991 | Poret | |
| 5,031,179 A | 7/1991 | Yoshida et al. | |
| 5,034,914 A | 7/1991 | Osterlund | |
| 5,036,473 A | 7/1991 | Butts et al. | |
| 5,036,493 A | 7/1991 | Nielsen | |
| 5,041,924 A | 8/1991 | Blackborow et al. | |
| 5,043,978 A | 8/1991 | Nagler et al. | |
| 5,047,924 A | 9/1991 | Fujioka et al. | |
| 5,055,997 A | 10/1991 | Sluijter et al. | |
| 5,065,308 A | 11/1991 | Evans | |
| 5,072,178 A | 12/1991 | Matsumoto | |
| 5,081,375 A | 1/1992 | Pickett et al. | |
| 5,099,447 A | 3/1992 | Myszewski | |
| 5,103,311 A | 4/1992 | Sluijter et al. | |
| 5,109,503 A | 4/1992 | Cruickshank et al. | |
| 5,113,498 A | 5/1992 | Evan et al. | |
| 5,115,510 A | 5/1992 | Okamoto et al. | |
| 5,119,290 A | 6/1992 | Loo et al. | |
| 5,123,109 A | 6/1992 | Hillis | |
| 5,128,559 A | 7/1992 | Steele | |
| 5,142,469 A | 8/1992 | Weisenborn | |
| 5,144,166 A | 9/1992 | Camarota et al. | |
| 5,193,202 A | 3/1993 | Jackson et al. | |
| 5,203,005 A | 4/1993 | Horst | |
| 5,204,935 A | 4/1993 | Mihara et al. | |
| 5,208,491 A | 5/1993 | Ebeling et al. | |
| 5,212,716 A | 5/1993 | Ferraiolo et al. | |
| 5,212,777 A | 5/1993 | Gove et al. | |
| 5,218,302 A | 6/1993 | Loewe et al. | |
| 5,226,122 A | 7/1993 | Thayer et al. | |
| RE34,363 E | 8/1993 | Freeman | |
| 5,233,539 A | 8/1993 | Agrawal et al. | |
| 5,237,686 A | 8/1993 | Asano et al. | |
| 5,243,238 A | 9/1993 | Kean | |
| 5,245,616 A | 9/1993 | Olson | |
| 5,247,689 A | 9/1993 | Ewert | |
| RE34,444 E | 11/1993 | Kaplinsky | |
| 5,274,593 A | 12/1993 | Proebsting | |
| 5,276,836 A | 1/1994 | Fukumaru et al. | |
| 5,287,472 A | 2/1994 | Horst | |
| 5,287,511 A | 2/1994 | Robinson et al. | |
| 5,287,532 A | 2/1994 | Hunt | |
| 5,301,284 A | 4/1994 | Estes et al. | |
| 5,301,344 A | 4/1994 | Kolchinsky | |
| 5,303,172 A | 4/1994 | Magar et al. | |
| 5,311,079 A | 5/1994 | Ditlow et al. | |
| 5,327,125 A | 7/1994 | Iwase et al. | |
| 5,336,950 A | 8/1994 | Popli et al. | |
| 5,343,406 A | 8/1994 | Freeman et al. | |
| 5,347,639 A | 9/1994 | Rechtschaffen et al. | |
| 5,349,193 A | 9/1994 | Mott et al. | |
| 5,353,432 A | 10/1994 | Richek et al. | |
| 5,355,508 A | 10/1994 | Kan | |
| 5,361,373 A | 11/1994 | Gilson | |
| 5,365,125 A | 11/1994 | Goetting et al. | |
| 5,379,444 A | 1/1995 | Mumme | |
| 5,386,154 A | 1/1995 | Goetting et al. | |
| 5,386,518 A | 1/1995 | Reagle et al. | |
| 5,392,437 A | 2/1995 | Matter et al. | |
| 5,410,723 A | 4/1995 | Schmidt et al. | |
| 5,412,795 A | 5/1995 | Larson | |
| 5,418,952 A | 5/1995 | Morley et al. | |
| 5,418,953 A | 5/1995 | Hunt et al. | |
| 5,421,019 A | 5/1995 | Holsztynski et al. | |
| 5,422,823 A | 6/1995 | Agrawal et al. | |
| 5,425,036 A | 6/1995 | Liu et al. | |
| 5,426,378 A | 6/1995 | Ong | |
| 5,428,526 A | 6/1995 | Flood et al. | |
| 5,430,687 A | 7/1995 | Hung et al. | |
| 5,435,000 A | 7/1995 | Boothroyd et al. | |
| 5,440,245 A | 8/1995 | Galbraith et al. | |
| 5,440,538 A | 8/1995 | Olsen | |
| 5,442,790 A | 8/1995 | Nosenchuck | |
| 5,444,394 A | 8/1995 | Watson et al. | |
| 5,448,186 A | 9/1995 | Kawata | |
| 5,450,022 A | 9/1995 | New | |
| 5,455,525 A | 10/1995 | Ho et al. | |
| 5,457,644 A | 10/1995 | McCollum | |
| 5,465,375 A | 11/1995 | Thepaut et al. | |
| 5,469,003 A | 11/1995 | Kean | |
| 5,473,266 A | 12/1995 | Ahanin et al. | |
| 5,473,267 A | 12/1995 | Stansfield | |
| 5,475,583 A | 12/1995 | Bock et al. | |
| 5,475,803 A | 12/1995 | Stearns et al. | |
| 5,475,856 A | 12/1995 | Kogge | |
| 5,477,525 A | 12/1995 | Okabe | |
| 5,483,620 A | 1/1996 | Pechanek et al. | |
| 5,485,103 A | 1/1996 | Pedersen et al. | |
| 5,485,104 A | 1/1996 | Agrawal et al. | |
| 5,489,857 A | 2/1996 | Agrawal et al. | |
| 5,491,353 A | 2/1996 | Kean | |
| 5,493,239 A | 2/1996 | Zlotnick | |
| 5,493,663 A | 2/1996 | Parikh | |
| 5,497,498 A | 3/1996 | Taylor | |
| 5,502,838 A * | 3/1996 | Kikinis | 713/501 |
| 5,504,439 A | 4/1996 | Tavana | |
| 5,506,998 A | 4/1996 | Kato et al. | |
| 5,510,730 A | 4/1996 | El Gamal et al. | |
| 5,511,173 A | 4/1996 | Yamaura et al. | |
| 5,513,366 A | 4/1996 | Agarwal et al. | |
| 5,521,837 A | 5/1996 | Frankle et al. | |
| 5,522,083 A | 5/1996 | Gove et al. | |
| 5,525,971 A | 6/1996 | Flynn | |
| 5,530,873 A | 6/1996 | Takano | |
| 5,530,946 A | 6/1996 | Bouvier et al. | |
| 5,532,693 A | 7/1996 | Winters et al. | |
| 5,532,957 A | 7/1996 | Malhi | |
| 5,535,406 A | 7/1996 | Kolchinsky | |

| | | | | | | |
|---|---|---|---|---|---|---|
| 5,537,057 A | 7/1996 | Leong et al. | | 5,745,734 A | 4/1998 | Craft et al. |
| 5,537,580 A | 7/1996 | Giomi et al. | | 5,748,872 A | 5/1998 | Norman |
| 5,537,601 A | 7/1996 | Kimura et al. | | 5,748,979 A | 5/1998 | Trimberger |
| 5,541,530 A | 7/1996 | Cliff et al. | | 5,752,035 A | 5/1998 | Trimberger |
| 5,544,336 A | 8/1996 | Kato et al. | | 5,754,459 A | 5/1998 | Telikepalli |
| 5,548,773 A | 8/1996 | Kemeny et al. | | 5,754,820 A | 5/1998 | Yamagami |
| 5,550,782 A | 8/1996 | Cliff et al. | | 5,754,827 A | 5/1998 | Barbier et al. |
| 5,555,434 A | 9/1996 | Carlstedt | | 5,754,871 A | 5/1998 | Wilkinson et al. |
| 5,559,450 A | 9/1996 | Ngai et al. | | 5,754,876 A | 5/1998 | Tamaki et al. |
| 5,561,738 A | 10/1996 | Kinerk et al. | | 5,760,602 A | 6/1998 | Tan |
| 5,568,624 A | 10/1996 | Sites et al. | | 5,761,484 A | 6/1998 | Agarwal et al. |
| 5,570,040 A | 10/1996 | Lytle et al. | | 5,768,629 A | 6/1998 | Wise et al. |
| 5,572,710 A | 11/1996 | Asano et al. | | 5,773,994 A | 6/1998 | Jones |
| 5,574,927 A | 11/1996 | Scantlin | | 5,778,237 A | 7/1998 | Yamamoto et al. |
| 5,574,930 A | 11/1996 | Halverson, Jr. et al. | | 5,778,439 A | 7/1998 | Trimberger et al. |
| 5,581,731 A | 12/1996 | King et al. | | 5,781,756 A | 7/1998 | Hung |
| 5,581,734 A | 12/1996 | DiBrino et al. | | 5,784,313 A | 7/1998 | Trimberger et al. |
| 5,583,450 A | 12/1996 | Trimberger et al. | | 5,784,630 A | 7/1998 | Saito et al. |
| 5,584,013 A | 12/1996 | Cheong et al. | | 5,784,636 A | 7/1998 | Rupp |
| 5,586,044 A | 12/1996 | Agrawal et al. | | 5,794,059 A | 8/1998 | Barker et al. |
| 5,587,921 A | 12/1996 | Agrawal et al. | | 5,794,062 A | 8/1998 | Baxter |
| 5,588,152 A | 12/1996 | Dapp et al. | | 5,801,547 A | 9/1998 | Kean |
| 5,590,345 A | 12/1996 | Barker et al. | | 5,801,715 A | 9/1998 | Norman |
| 5,590,348 A | 12/1996 | Phillips et al. | | 5,801,958 A | 9/1998 | Dangelo et al. |
| 5,596,742 A | 1/1997 | Agarwal et al. | | 5,802,290 A | 9/1998 | Casselman |
| 5,600,265 A | 2/1997 | El Gamal et al. | | 5,804,986 A | 9/1998 | Jones |
| 5,600,597 A | 2/1997 | Kean et al. | | 5,815,004 A | 9/1998 | Trimberger et al. |
| 5,600,845 A | 2/1997 | Gilson | | 5,815,715 A | 9/1998 | Kucukcakar |
| 5,602,999 A | 2/1997 | Hyatt | | 5,815,726 A | 9/1998 | Cliff |
| 5,603,005 A | 2/1997 | Bauman et al. | | 5,821,774 A | 10/1998 | Veytsman et al. |
| 5,606,698 A | 2/1997 | Powell | | 5,828,229 A | 10/1998 | Cliff et al. |
| 5,608,342 A | 3/1997 | Trimberger | | 5,828,858 A | 10/1998 | Athanas et al. |
| 5,611,049 A | 3/1997 | Pitts | | 5,831,448 A | 11/1998 | Kean |
| 5,617,547 A | 4/1997 | Feeney et al. | | 5,832,288 A | 11/1998 | Wong |
| 5,617,577 A | 4/1997 | Barker et al. | | 5,838,165 A | 11/1998 | Chatter |
| 5,619,720 A | 4/1997 | Garde et al. | | 5,838,988 A | 11/1998 | Panwar et al. |
| 5,625,806 A | 4/1997 | Kromer | | 5,841,973 A | 11/1998 | Kessler et al. |
| 5,625,836 A | 4/1997 | Barker et al. | | 5,844,422 A | 12/1998 | Trimberger et al. |
| 5,627,992 A | 5/1997 | Baror | | 5,844,888 A | 12/1998 | Markkula, Jr. et al. |
| 5,634,131 A | 5/1997 | Matter et al. | | 5,848,238 A | 12/1998 | Shimomura et al. |
| 5,635,851 A | 6/1997 | Tavana | | 5,854,918 A | 12/1998 | Baxter |
| 5,642,058 A | 6/1997 | Trimberger et al. | | 5,857,097 A | 1/1999 | Henzinger et al. |
| 5,646,544 A | 7/1997 | Iadanza | | 5,857,109 A | 1/1999 | Taylor |
| 5,646,545 A | 7/1997 | Trimberger et al. | | 5,859,544 A | 1/1999 | Norman |
| 5,649,176 A | 7/1997 | Selvidge et al. | | 5,860,119 A | 1/1999 | Dockser |
| 5,649,179 A | 7/1997 | Steenstra et al. | | 5,862,403 A | 1/1999 | Kanai et al. |
| 5,652,529 A | 7/1997 | Gould et al. | | 5,867,691 A | 2/1999 | Shiraishi |
| 5,652,894 A | 7/1997 | Hu et al. | | 5,867,723 A | 2/1999 | Peters et al. |
| 5,655,069 A | 8/1997 | Ogawara et al. | | 5,870,620 A | 2/1999 | Kadosumi et al. |
| 5,655,124 A | 8/1997 | Lin | | 5,884,075 A | 3/1999 | Hester et al. |
| 5,656,950 A | 8/1997 | Duong et al. | | 5,887,162 A | 3/1999 | Williams et al. |
| 5,657,330 A | 8/1997 | Matsumoto | | 5,887,165 A | 3/1999 | Martel et al. |
| 5,659,785 A | 8/1997 | Pechanek et al. | | 5,889,533 A | 3/1999 | Lee |
| 5,659,797 A | 8/1997 | Zandveld et al. | | 5,889,982 A | 3/1999 | Rodgers et al. |
| 5,675,262 A | 10/1997 | Duong et al. | | 5,892,370 A | 4/1999 | Eaton et al. |
| 5,675,743 A | 10/1997 | Mavity | | 5,892,961 A | 4/1999 | Trimberger |
| 5,675,757 A | 10/1997 | Davidson et al. | | 5,892,962 A | 4/1999 | Cloutier |
| 5,675,777 A | 10/1997 | Glickman | | 5,894,565 A | 4/1999 | Furtek et al. |
| 5,677,909 A | 10/1997 | Heide | | 5,895,487 A | 4/1999 | Boyd et al. |
| 5,680,583 A | 10/1997 | Kuijsten | | 5,898,602 A | 4/1999 | Rothman et al. |
| 5,682,491 A | 10/1997 | Pechanek et al. | | 5,901,279 A | 5/1999 | Davis, III |
| 5,682,544 A | 10/1997 | Pechanek et al. | | 5,915,099 A | 6/1999 | Takata et al. |
| 5,687,325 A | 11/1997 | Chang | | 5,915,123 A | 6/1999 | Mirsky et al. |
| 5,694,602 A | 12/1997 | Smith | | 5,924,119 A | 7/1999 | Sindhu et al. |
| 5,696,791 A | 12/1997 | Yeung | | 5,926,638 A | 7/1999 | Inoue |
| 5,696,976 A | 12/1997 | Nizar et al. | | 5,933,023 A | 8/1999 | Young |
| 5,701,091 A | 12/1997 | Kean | | 5,933,642 A | 8/1999 | Greenbaum et al. |
| 5,705,938 A | 1/1998 | Kean | | 5,936,424 A | 8/1999 | Young et al. |
| 5,706,482 A | 1/1998 | Matsushima et al. | | 5,943,242 A | 8/1999 | Vorbach et al. |
| 5,713,037 A | 1/1998 | Wilkinson et al. | | 5,956,518 A | 9/1999 | DeHon et al. |
| 5,717,890 A | 2/1998 | Ichida et al. | | 5,960,193 A | 9/1999 | Guttag et al. |
| 5,717,943 A | 2/1998 | Barker et al. | | 5,960,200 A | 9/1999 | Eager et al. |
| 5,727,229 A | 3/1998 | Kan et al. | | 5,966,143 A | 10/1999 | Breternitz, Jr. |
| 5,732,209 A | 3/1998 | Vigil et al. | | 5,966,534 A | 10/1999 | Cooke et al. |
| 5,734,869 A | 3/1998 | Chen | | 5,970,254 A | 10/1999 | Cooke et al. |
| 5,734,921 A | 3/1998 | Dapp et al. | | 5,978,260 A | 11/1999 | Trimberger et al. |
| 5,737,516 A | 4/1998 | Circello et al. | | 5,978,583 A | 11/1999 | Ekanadham et al. |
| 5,737,565 A | 4/1998 | Mayfield | | 5,996,048 A | 11/1999 | Cherabuddi et al. |
| 5,742,180 A | 4/1998 | DeHon et al. | | 5,996,083 A | 11/1999 | Gupta et al. |

| Patent No. | Kind | Date | Inventor |
|---|---|---|---|
| 5,999,990 | A | 12/1999 | Sharrit et al. |
| 6,003,143 | A | 12/1999 | Kim et al. |
| 6,011,407 | A | 1/2000 | New |
| 6,014,509 | A | 1/2000 | Furtek et al. |
| 6,020,758 | A | 2/2000 | Patel et al. |
| 6,020,760 | A | 2/2000 | Sample et al. |
| 6,021,490 | A | 2/2000 | Vorbach et al. |
| 6,023,564 | A | 2/2000 | Trimberger |
| 6,023,742 | A | 2/2000 | Ebeling et al. |
| 6,026,478 | A | 2/2000 | Dowling |
| 6,026,481 | A | 2/2000 | New et al. |
| 6,034,538 | A | 3/2000 | Abramovici |
| 6,035,371 | A | 3/2000 | Magloire |
| 6,038,650 | A | 3/2000 | Vorbach et al. |
| 6,038,656 | A | 3/2000 | Martin et al. |
| 6,044,030 | A | 3/2000 | Zheng et al. |
| 6,045,585 | A | 4/2000 | Blainey |
| 6,047,115 | A | 4/2000 | Mohan et al. |
| 6,049,222 | A | 4/2000 | Lawman |
| 6,049,866 | A | 4/2000 | Earl |
| 6,052,524 | A | 4/2000 | Pauna |
| 6,052,773 | A | 4/2000 | DeHon et al. |
| 6,054,873 | A | 4/2000 | Laramie |
| 6,055,619 | A | 4/2000 | North et al. |
| 6,058,266 | A | 5/2000 | Megiddo et al. |
| 6,058,469 | A | 5/2000 | Baxter |
| 6,064,819 | A | 5/2000 | Franssen et al. |
| 6,072,348 | A | 6/2000 | New et al. |
| 6,076,157 | A | 6/2000 | Borkenhagen et al. |
| 6,077,315 | A | 6/2000 | Greenbaum et al. |
| 6,078,736 | A | 6/2000 | Guccione |
| 6,081,903 | A | 6/2000 | Vorbach et al. |
| 6,084,429 | A | 7/2000 | Trimberger |
| 6,085,317 | A | 7/2000 | Smith |
| 6,086,628 | A | 7/2000 | Dave et al. |
| 6,088,795 | A | 7/2000 | Vorbach et al. |
| 6,092,174 | A | 7/2000 | Roussakov |
| RE36,839 | E | 8/2000 | Simmons et al. |
| 6,096,091 | A | 8/2000 | Hartmann |
| 6,105,105 | A | 8/2000 | Trimberger |
| 6,105,106 | A | 8/2000 | Manning |
| 6,108,760 | A | 8/2000 | Mirsky et al. |
| 6,118,724 | A | 9/2000 | Higginbottom |
| 6,119,181 | A | 9/2000 | Vorbach et al. |
| 6,122,719 | A | 9/2000 | Mirsky et al. |
| 6,125,072 | A | 9/2000 | Wu |
| 6,125,408 | A | 9/2000 | McGee et al. |
| 6,127,908 | A | 10/2000 | Bozler et al. |
| 6,128,720 | A | 10/2000 | Pechanek et al. |
| 6,134,166 | A | 10/2000 | Lytle et al. |
| 6,137,307 | A | 10/2000 | Iwanczuk et al. |
| 6,145,072 | A | 11/2000 | Shams et al. |
| 6,150,837 | A | 11/2000 | Beal et al. |
| 6,150,839 | A | 11/2000 | New et al. |
| 6,154,048 | A | 11/2000 | Iwanczuk et al. |
| 6,154,049 | A | 11/2000 | New |
| 6,154,826 | A | 11/2000 | Wulf et al. |
| 6,157,214 | A | 12/2000 | Marshall |
| 6,170,051 | B1 | 1/2001 | Dowling |
| 6,172,520 | B1 | 1/2001 | Lawman et al. |
| 6,173,419 | B1 | 1/2001 | Barnett |
| 6,173,434 | B1 | 1/2001 | Wirthlin et al. |
| 6,178,494 | B1 | 1/2001 | Casselman |
| 6,185,256 | B1 | 2/2001 | Saito et al. |
| 6,185,731 | B1 | 2/2001 | Maeda et al. |
| 6,188,240 | B1 | 2/2001 | Nakaya |
| 6,188,650 | B1 | 2/2001 | Hamada et al. |
| 6,198,304 | B1 | 3/2001 | Sasaki |
| 6,201,406 | B1 | 3/2001 | Iwanczuk et al. |
| 6,202,163 | B1 | 3/2001 | Gabzdyl et al. |
| 6,202,182 | B1 | 3/2001 | Abramovici et al. |
| 6,204,687 | B1 | 3/2001 | Schultz et al. |
| 6,211,697 | B1 | 4/2001 | Lien et al. |
| 6,212,544 | B1 | 4/2001 | Borkenhagen et al. |
| 6,212,650 | B1 | 4/2001 | Guccione |
| 6,215,326 | B1 | 4/2001 | Jefferson et al. |
| 6,216,223 | B1 | 4/2001 | Revilla et al. |
| 6,219,833 | B1 | 4/2001 | Solomon et al. |
| RE37,195 | E | 5/2001 | Kean |
| 6,230,307 | B1 | 5/2001 | Davis et al. |
| 6,240,502 | B1 | 5/2001 | Panwar et al. |
| 6,243,808 | B1 | 6/2001 | Wang |
| 6,247,147 | B1 | 6/2001 | Beenstra et al. |
| 6,249,756 | B1 | 6/2001 | Bunton et al. |
| 6,252,792 | B1 | 6/2001 | Marshall et al. |
| 6,256,724 | B1 | 7/2001 | Hocevar et al. |
| 6,260,114 | B1 | 7/2001 | Schug |
| 6,260,179 | B1 | 7/2001 | Ohsawa et al. |
| 6,262,908 | B1 | 7/2001 | Marshall et al. |
| 6,263,430 | B1 | 7/2001 | Trimberger et al. |
| 6,266,760 | B1 | 7/2001 | DeHon et al. |
| 6,279,077 | B1 | 8/2001 | Nasserbakht et al. |
| 6,282,627 | B1 | 8/2001 | Wong et al. |
| 6,282,701 | B1 | 8/2001 | Wygodny et al. |
| 6,285,624 | B1 | 9/2001 | Chen |
| 6,286,134 | B1 | 9/2001 | Click, Jr. et al. |
| 6,288,566 | B1 | 9/2001 | Hanrahan et al. |
| 6,289,440 | B1 | 9/2001 | Casselman |
| 6,298,043 | B1 | 10/2001 | Mauger et al. |
| 6,298,396 | B1 | 10/2001 | Loyer et al. |
| 6,298,472 | B1 | 10/2001 | Phillips et al. |
| 6,301,706 | B1 | 10/2001 | Maslennikov et al. |
| 6,311,200 | B1 | 10/2001 | Hanrahan et al. |
| 6,311,265 | B1 | 10/2001 | Beckerle et al. |
| 6,321,298 | B1 | 11/2001 | Hubis |
| 6,321,366 | B1 | 11/2001 | Tseng et al. |
| 6,321,373 | B1 | 11/2001 | Ekanadham et al. |
| 6,338,106 | B1 | 1/2002 | Vorbach et al. |
| 6,339,424 | B1 | 1/2002 | Ishikawa et al. |
| 6,339,840 | B1 | 1/2002 | Kothari et al. |
| 6,341,318 | B1 | 1/2002 | Dakhil |
| 6,347,346 | B1 | 2/2002 | Taylor |
| 6,349,346 | B1 | 2/2002 | Hanrahan et al. |
| 6,353,841 | B1 | 3/2002 | Marshall et al. |
| 6,362,650 | B1 | 3/2002 | New et al. |
| 6,370,596 | B1 | 4/2002 | Dakhil |
| 6,373,779 | B1 | 4/2002 | Pang et al. |
| 6,374,286 | B1 | 4/2002 | Gee |
| 6,378,068 | B1 | 4/2002 | Foster et al. |
| 6,381,624 | B1 | 4/2002 | Colon-Bonet et al. |
| 6,389,379 | B1 | 5/2002 | Lin et al. |
| 6,389,579 | B1 | 5/2002 | Phillips et al. |
| 6,392,912 | B1 | 5/2002 | Hanrahan et al. |
| 6,400,601 | B1 | 6/2002 | Sudo et al. |
| 6,404,224 | B1 | 6/2002 | Azegami et al. |
| 6,405,185 | B1 | 6/2002 | Pechanek et al. |
| 6,405,299 | B1 | 6/2002 | Vorbach et al. |
| 6,421,808 | B1 | 7/2002 | McGeer |
| 6,421,809 | B1 | 7/2002 | Wuytack et al. |
| 6,421,817 | B1 | 7/2002 | Mohan et al. |
| 6,425,054 | B1 | 7/2002 | Nguyen |
| 6,425,068 | B1 | 7/2002 | Vorbach |
| 6,426,649 | B1 | 7/2002 | Fu et al. |
| 6,427,156 | B1 | 7/2002 | Chapman et al. |
| 6,430,309 | B1 | 8/2002 | Pressman et al. |
| 6,434,642 | B1 | 8/2002 | Camilleri et al. |
| 6,434,672 | B1 | 8/2002 | Gaither |
| 6,434,695 | B1 | 8/2002 | Esfahani et al. |
| 6,434,699 | B1 | 8/2002 | Jones et al. |
| 6,437,441 | B1 | 8/2002 | Yamamoto |
| 6,438,747 | B1 | 8/2002 | Schreiber et al. |
| 6,449,283 | B1 | 9/2002 | Chao et al. |
| 6,456,628 | B1 | 9/2002 | Greim et al. |
| 6,457,116 | B1 | 9/2002 | Mirsky et al. |
| 6,476,634 | B1 | 11/2002 | Bilski |
| 6,477,643 | B1 | 11/2002 | Vorbach et al. |
| 6,480,937 | B1 | 11/2002 | Vorbach et al. |
| 6,480,954 | B2 | 11/2002 | Trimberger et al. |
| 6,483,343 | B1 | 11/2002 | Faith et al. |
| 6,487,709 | B1 | 11/2002 | Keller et al. |
| 6,490,695 | B1 | 12/2002 | Zagorski et al. |
| 6,496,740 | B1 | 12/2002 | Robertson et al. |
| 6,496,902 | B1 | 12/2002 | Faanes et al. |
| 6,496,971 | B1 | 12/2002 | Lesea et al. |
| 6,504,398 | B1 | 1/2003 | Lien et al. |
| 6,507,898 | B1 | 1/2003 | Gibson et al. |
| 6,507,947 | B1 | 1/2003 | Schreiber et al. |
| 6,512,804 | B1 | 1/2003 | Johnson et al. |

| | | |
|---|---|---|
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 | 2/2003 | Lam et al. |
| 6,523,107 B1 | 2/2003 | Stansfield et al. |
| 6,525,678 B1 | 2/2003 | Veenstra et al. |
| 6,526,520 B1 | 2/2003 | Vorbach et al. |
| 6,538,468 B1 | 3/2003 | Moore |
| 6,538,470 B1 | 3/2003 | Langhammer et al. |
| 6,539,415 B1 | 3/2003 | Mercs |
| 6,539,438 B1 | 3/2003 | Ledzius et al. |
| 6,539,477 B1 | 3/2003 | Seawright |
| 6,542,394 B2 | 4/2003 | Marshall et al. |
| 6,542,844 B1 | 4/2003 | Hanna |
| 6,542,998 B1 | 4/2003 | Vorbach |
| 6,553,395 B2 | 4/2003 | Marshall et al. |
| 6,553,479 B2 | 4/2003 | Mirsky et al. |
| 6,567,834 B1 | 5/2003 | Marshall et al. |
| 6,571,381 B1 | 5/2003 | Vorbach et al. |
| 6,587,939 B1 | 7/2003 | Takano |
| 6,598,128 B1 | 7/2003 | Yoshioka et al. |
| 6,606,704 B1 | 8/2003 | Adiletta et al. |
| 6,624,819 B1 | 9/2003 | Lewis |
| 6,625,631 B2 | 9/2003 | Ruehle |
| 6,631,487 B1 | 10/2003 | Abramovici et al. |
| 6,633,181 B1 | 10/2003 | Rupp |
| 6,657,457 B1 | 12/2003 | Hanrahan et al. |
| 6,658,564 B1 | 12/2003 | Smith et al. |
| 6,665,758 B1 | 12/2003 | Frazier et al. |
| 6,668,237 B1 | 12/2003 | Guccione et al. |
| 6,681,388 B1 | 1/2004 | Sato et al. |
| 6,687,788 B2 | 2/2004 | Vorbach et al. |
| 6,697,979 B1 | 2/2004 | Vorbach et al. |
| 6,704,816 B1 | 3/2004 | Burke |
| 6,708,223 B1 | 3/2004 | Wang et al. |
| 6,708,325 B2 | 3/2004 | Cooke et al. |
| 6,717,436 B2 | 4/2004 | Kress et al. |
| 6,721,830 B2 | 4/2004 | Vorbach et al. |
| 6,725,334 B2 | 4/2004 | Barroso et al. |
| 6,728,871 B1 | 4/2004 | Vorbach et al. |
| 6,745,317 B1 | 6/2004 | Mirsky et al. |
| 6,748,440 B1 | 6/2004 | Lisitsa et al. |
| 6,751,722 B2 | 6/2004 | Mirsky et al. |
| 6,754,805 B1 | 6/2004 | Juan |
| 6,757,847 B1 | 6/2004 | Farkash et al. |
| 6,757,892 B1 | 6/2004 | Gokhale et al. |
| 6,782,445 B1 | 8/2004 | Olgiati et al. |
| 6,785,826 B1 | 8/2004 | Durham et al. |
| 6,802,026 B1 | 10/2004 | Patterson et al. |
| 6,803,787 B1 | 10/2004 | Wicker, Jr. |
| 6,820,188 B2 | 11/2004 | Stansfield et al. |
| 6,829,697 B1 | 12/2004 | Davis et al. |
| 6,836,842 B1 | 12/2004 | Guccione et al. |
| 6,847,370 B2 | 1/2005 | Baldwin et al. |
| 6,859,869 B1 | 2/2005 | Vorbach |
| 6,868,476 B2 | 3/2005 | Rosenbluth et al. |
| 6,871,341 B1 | 3/2005 | Shyr |
| 6,874,108 B1 | 3/2005 | Abramovici et al. |
| 6,886,092 B1 | 4/2005 | Douglass et al. |
| 6,901,502 B2 | 5/2005 | Yano et al. |
| 6,928,523 B2 | 8/2005 | Yamada |
| 6,957,306 B2 | 10/2005 | So et al. |
| 6,961,924 B2 | 11/2005 | Bates et al. |
| 6,975,138 B2 | 12/2005 | Pani et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,687 B2 | 3/2006 | Ichimura |
| 7,028,107 B2 | 4/2006 | Vorbach et al. |
| 7,036,114 B2 | 4/2006 | McWilliams et al. |
| 7,038,952 B1 | 5/2006 | Zack et al. |
| 7,144,152 B2 * | 12/2006 | Rusu et al. .................... 374/141 |
| 7,155,708 B2 | 12/2006 | Hammes et al. |
| 7,164,422 B1 | 1/2007 | Wholey et al. |
| 7,210,129 B2 | 4/2007 | May et al. |
| 7,216,204 B2 | 5/2007 | Rosenbluth |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,346,644 B1 | 3/2008 | Langhammer et al. |
| 7,350,178 B1 | 3/2008 | Crosland et al. |
| 7,382,156 B2 | 6/2008 | Pani et al. |
| 7,455,450 B2 * | 11/2008 | Liu et al. ....................... 374/111 |
| 7,595,659 B2 | 9/2009 | Vorbach et al. |
| 7,650,448 B2 | 1/2010 | Vorbach et al. |
| 7,657,877 B2 | 2/2010 | Vorbach et al. |
| 7,759,968 B1 | 7/2010 | Hussein et al. |
| 7,873,811 B1 | 1/2011 | Wolinski et al. |
| 2001/0001860 A1 | 5/2001 | Beiu |
| 2001/0003834 A1 | 6/2001 | Shimonishi |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0010853 A1 | 1/2002 | Trimberger et al. |
| 2002/0013861 A1 | 1/2002 | Adiletta et al. |
| 2002/0038414 A1 | 3/2002 | Taylor |
| 2002/0045952 A1 | 4/2002 | Blemel |
| 2002/0051482 A1 | 5/2002 | Lomp |
| 2002/0073282 A1 | 6/2002 | Chauvel et al. |
| 2002/0083308 A1 | 6/2002 | Pereira et al. |
| 2002/0099759 A1 | 7/2002 | Gootherts |
| 2002/0103839 A1 | 8/2002 | Ozawa |
| 2002/0124238 A1 | 9/2002 | Metzgen |
| 2002/0138716 A1 | 9/2002 | Master et al. |
| 2002/0143505 A1 | 10/2002 | Drusinsky |
| 2002/0144229 A1 | 10/2002 | Hanrahan |
| 2002/0147932 A1 * | 10/2002 | Brock et al. .................. 713/300 |
| 2002/0152060 A1 | 10/2002 | Tseng |
| 2002/0156962 A1 | 10/2002 | Chopra et al. |
| 2002/0162097 A1 | 10/2002 | Meribout |
| 2002/0165886 A1 | 11/2002 | Lam |
| 2003/0001615 A1 | 1/2003 | Sueyoshi et al. |
| 2003/0014743 A1 | 1/2003 | Cooke et al. |
| 2003/0046607 A1 | 3/2003 | May et al. |
| 2003/0052711 A1 | 3/2003 | Taylor |
| 2003/0055861 A1 | 3/2003 | Lai et al. |
| 2003/0056062 A1 | 3/2003 | Prabhu |
| 2003/0056085 A1 | 3/2003 | Vorbach |
| 2003/0056091 A1 | 3/2003 | Greenberg |
| 2003/0056202 A1 | 3/2003 | May et al. |
| 2003/0061542 A1 | 3/2003 | Bates et al. |
| 2003/0062922 A1 | 4/2003 | Douglass et al. |
| 2003/0070059 A1 | 4/2003 | Dally et al. |
| 2003/0086300 A1 | 5/2003 | Noyes et al. |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2003/0154349 A1 | 8/2003 | Berg et al. |
| 2003/0192032 A1 | 10/2003 | Andrade et al. |
| 2003/0226056 A1 | 12/2003 | Yip et al. |
| 2004/0015899 A1 | 1/2004 | May et al. |
| 2004/0025005 A1 | 2/2004 | Vorbach et al. |
| 2004/0039880 A1 | 2/2004 | Pentkovski et al. |
| 2004/0078548 A1 | 4/2004 | Claydon et al. |
| 2004/0088689 A1 | 5/2004 | Hammes |
| 2004/0088691 A1 | 5/2004 | Hammes et al. |
| 2004/0168099 A1 | 8/2004 | Vorbach et al. |
| 2004/0199688 A1 | 10/2004 | Vorbach et al. |
| 2005/0066213 A1 | 3/2005 | Vorbach et al. |
| 2005/0091468 A1 | 4/2005 | Morita et al. |
| 2005/0144210 A1 | 6/2005 | Simkins et al. |
| 2005/0144212 A1 | 6/2005 | Simkins et al. |
| 2005/0144215 A1 | 6/2005 | Simkins et al. |
| 2006/0036988 A1 | 2/2006 | Allen et al. |
| 2006/0230094 A1 | 10/2006 | Simkins et al. |
| 2006/0230096 A1 | 10/2006 | Thendean et al. |
| 2007/0050603 A1 | 3/2007 | Vorbach et al. |
| 2007/0083730 A1 | 4/2007 | Vorbach et al. |
| 2008/0313383 A1 | 12/2008 | Morita et al. |
| 2009/0085603 A1 | 4/2009 | Paul et al. |
| 2009/0193384 A1 | 7/2009 | Sima et al. |
| 2010/0306602 A1 | 12/2010 | Kamiya et al. |

FOREIGN PATENT DOCUMENTS

| | | |
|---|---|---|
| DE | 44 16 881 | 11/1994 |
| DE | 38 55 673 | 11/1996 |

| | | |
|---|---|---|
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 638 867 A2 | 8/1994 |
| EP | 0 628 917 | 12/1994 |
| EP | 0 678 985 | 10/1995 |
| EP | 0 686 915 | 12/1995 |
| EP | 0 696 001 | 2/1996 |
| EP | 0 707 269 | 4/1996 |
| EP | 0 726 532 | 8/1996 |
| EP | 0 735 685 | 10/1996 |
| EP | 0 746 106 | 12/1996 |
| EP | 0 748 051 | 12/1996 |
| EP | 0 926 594 | 6/1999 |
| EP | 1 061 439 | 12/2000 |
| EP | 1 115 204 | 7/2001 |
| EP | 1 146 432 | 10/2001 |
| EP | 1 669 885 | 6/2006 |
| FR | 2 752 466 | 2/1998 |
| GB | 2 304 438 | 3/1997 |
| JP | 58-058672 | 4/1983 |
| JP | 10-44571 | 2/1989 |
| JP | 1-229378 | 9/1989 |
| JP | 2-130023 | 5/1990 |
| JP | 2-226423 | 9/1990 |
| JP | 5-265705 | 10/1993 |
| JP | 5-276007 | 10/1993 |
| JP | 5-509184 | 12/1993 |
| JP | 6-266605 | 9/1994 |
| JP | 7-086921 | 3/1995 |
| JP | 7-154242 | 6/1995 |
| JP | 8-148989 | 6/1995 |
| JP | 7-182160 | 7/1995 |
| JP | 7-182167 | 7/1995 |
| JP | 8-044581 | 2/1996 |
| JP | 8-069447 | 3/1996 |
| JP | 8-101761 | 4/1996 |
| JP | 8-102492 | 4/1996 |
| JP | 8-106443 | 4/1996 |
| JP | 8-221164 | 8/1996 |
| JP | 8-250685 | 9/1996 |
| JP | 9-027745 | 1/1997 |
| JP | 9-237284 | 9/1997 |
| JP | 9-294069 | 11/1997 |
| JP | 11-046187 | 2/1999 |
| JP | 11-184718 | 7/1999 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 2001-167066 | 6/2001 |
| JP | 2001-510650 | 7/2001 |
| JP | 2001-236221 | 8/2001 |
| JP | 2002-0033457 | 1/2002 |
| JP | 3-961028 | 8/2007 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | WO00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/036507 | 5/2003 |
| WO | WO03/091875 | 11/2003 |
| WO | WO2004/053718 | 6/2004 |
| WO | WO2004/114128 | 12/2004 |
| WO | WO2005/045692 | 5/2005 |
| WO | WO 2007/030395 | 3/2007 |

OTHER PUBLICATIONS

Microsoft Press Computer Dictionary, Second Edition, Redmond, WA, 1994, 3 pages.
A Dictionary of Computing, Fourth Edition, Oxford University Press, 1997, 4 pages.
Communications Standard Dictionary, Third Edition, Martin Weik (Ed.), Chapman & Hall, 1996, 3 pages.
Dictionary of Communications Technology, Terms Definitions and Abbreviations, Second Edition, Gilbert Held (Ed.), John Wiley & Sons, England, 1995, 5 pages.
The Random House College Dictionary, Revised Edition, Random House, Inc., 1984, 14 pages.
The Random House College Dictionary, Revised Edition, Random House, Inc., 1984, 7 pages.
Random House Webster's College Dictionary with CD-ROM, Random House, 2001, 7 pages.
Random House Webster's College Dictionary with CD-ROM, Random House, 2001, 4 pages.
Random House Personal Computer Dictionary, Second Edition, Philip E. Margolis (Ed.), Random House, New York, 1996, 5 pages.
The IEEE Standard Dictionary of Electrical and Electronics Terms, Sixth Edition, 1996, 36 pages.
The IEEE Standard Dictionary of Electrical and Electronics Terms, Sixth Edition, 1996, 8 pages.
McGraw-Hill Electronics Dictionary, Sixth Edition, Neil Sclater et al. (Ed.), McGraw-Hill, 1997, 3 pages.
Modern Dictionary of Electronics, Sixth Edition, Rudolf Graf (Ed.), Newnes (Butterwoth-Heinemann), 1997, 5 pages.
The American Heritage Dictionary, Fourth Edition, Dell (Houghton-Mifflin), 2001, 5 pages.
The American Heritage Dictionary, Second College Edition, Houghton Mifflin, 1982, 23 pages.

The American Heritage Dictionary, Second College Edition, Houghton Mifflin, 1982, 8 pages.
The American Heritage Dictionary, Third Edition, Dell Publishing (Bantam Doubleday Dell Publishing Group, Inc.), 1994, 4 pages.
The American Heritage Dictionary, Fourth Edition, Dell/Houghton Mifflin 2001, 5 pages.
Webster's New Collegiate Dictionary, Merriam Co., 1981, 5 pages.
Webster's New Collegiate Dictionary, Merriam Co., 1981, 4 pages.
The Oxford American Dictionary and Language Guide, Oxford University Press, 1999, 5 pages.
The Oxford Duden German Dictionary, Edited by the Dudenredaktion and the German Section of the Oxford University Press, W. Scholze-Stubenrecht et al. (Eds), Clarendon Press, Oxford, 1990, 7 pages.
Oxford Dictionary of Computing, Oxford University Press, 2008, 4 pages.
Modern Dictionary of Electronics, Sixth Edition Revised and Updated, Rudolf F. Graf (Ed.), Butterworth-Heinemann, 1997, 7 pages.
Modern Dictionary of Electronics, Sixth Edition Revised and Updated, Rudolf F. Graf (Ed.), Butterworth-Heinemann, 1997, 5 pages.
Garner's Modern American Usage, Bryan A. Garner (Ed.), Oxford University Press, 2003, 3 pages.
The New Fowler's Modern English Usage, R.W. Burchfield (Ed.) , Oxford University Press, 2000, 3 pages.
Wikipedia, the free encyclopedia, "Granularity," at http://en.wikipedia.org/wiki/Granularity, Jun. 18, 2010, 4 pages.
Wordsmyth, The Premier Educational Dictionary—Thesaurus, at http://www.wordsmyth.net, "communication," Jun. 18, 2010, 1 page.
Yahoo! Education, "affect," at http://education.yahoo.com/reference/dictionary/entry/affect, Jun. 18, 2010, 2 pages.
mPulse Living Language, "high-level," at http://www.macmillandictionary.com/dictionary/american/hiah-level, Jun. 18, 2010, 1 page.
MSN Encarta, "regroup," at http://encarta.msn.com/encnet/features/dictionary/DictionaryResults.aspx?lextype=3&search=regroup, Jun. 17, 2010, 2 pages.
MSN Encarta, "synchronize," at http://encarta.msn.com/encnet/features/dictionary/DictionaryResults.aspx?lextype=3 &search=synchronize, Jun. 17, 2010, 2 pages.
MSN Encarta, "pattern," at http://encarta.msn.com/encnet/features/dictionary/DictionaryResults.aspx?lextype=3&search=pattern, Jun. 17, 2010, 2 pages.
MSN Encarta, "dimension," at http://encarta.msn.com/encnet/features/dictionary/DictionaryResults.aspx?lextype=3 &search=dimension, Jun. 17, 2010, 2 pages.
MSN Encarta, "communication," at http://encarta.msn.com/encnet/features/dictionary/DictionaryResults.aspx?lextype=3 &search=communication, Jun. 17, 2010, 2 pages.
MSN Encarta, "arrangement," at http://encarta.msn.com/encnet/features/dictionary/DictionaryResults.aspx?lextype=3 &search=arrangement, Jun. 17, 2010, 2 pages.
MSN Encarta, "vector,"at http://encarta.msn.com/encnet/features/dictionary/DictionaryResults.aspx?lextype=3&search=vector, Jul. 30, 2010, 2 pages.
Dictionary.com, "address," at http://dictionary.reference.com/browse/address, Jun. 18, 2010, 4 pages.
P.R . 4-3 Joint Claim Constructions Statement, *PACT XPP Technologies, AG v. Xilinx, Inc. and Avnet, Inc. et al.*, E.D. Texas, 2:07-cv-00563-CE, Jul. 19, 2010, pp. 1-50.
Order Granting Joint Motion for Leave to File an Amended Joint Claim Construction and Prehearing Statement and Joint Motion to File an Amended Joint Claim Construction and Prehearing Statement Pursuant to Local Patent Rule 4-3, and Exhibit A: P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 2, 2010, 72 pages.
P.R. 4-3 Amended Joint Claim Constructions Statement, *PACT XPP Technologies, AG v. Xilinx, Inc. and Avnet, Inc. et al.*, E.D. Texas, 2:07-cv-00563-CE, Aug. 3, 2010, pp. 1-65.
Exhibit A—P.R. 4-3 Amended Joint Claim Constructions Statement, *PACT XPP Technologies, AG v. Xilinx, Inc. and Avnet, Inc. et al.*, Ed. Texas, 2:07-cv-00563-CE, Aug. 2, 2010, pp. 1-66.
PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-55.
Declaration of Harry L. (Nick) Tredennick in Support of PACT's Claim Constructions, *PACT XPP Technologies, AG v. Xilinx, Inc, and Avnet, Inc. et al.*, E.D. Texas, 2:07-cv-00563-CE, Nov. 1, 2010, pp. 1-87.
Transcript of Harry (Nick) L. Tredennick III, Ph.D., Oct. 11, 2010, vol. 1, Exhibit 16 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-3.
Agreed and Disputed Terms, Exhibit 17 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-16.
Oral Videotaped Deposition—Joseph McAlexander dated Oct. 12, 2010, vol. 1, Exhibit 18 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-17.
Expert Report of Joe McAlexander Re Claim Construction dated Sep. 27, 2010, Exhibit 19 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-112.
Documents from File History of U.S. Appl. No. 09/290,342 (filed Apr. 12, 1999), Exhibit 20 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-37.
Amendment from File History of U.S. Appl. No. 10/156,397 (filed May 28, 2002), Exhibit 25 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Documents from File History U.S. Appl. No. 09/329,132 (filed Jun. 9, 1999), Exhibit 27 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-36.
Amendment from Fife History of U.S. Appl. No. 10/791,501 (filed Mar. 1, 2004), Exhibit 39 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-9.
Amendment from File History of U.S. Appl. No. 10/265,846 (filed Oct. 7, 2002), Exhibit 40 of PACT's Opening Claim Construction Brief, *PACT XPP Technologies, AG v. Xilinx, Inc. and Avnet, Inc. et al.*, E.D. Texas, 2:07-cv-00563-CE, Nov. 1, 2010, pp. 1-12.
Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-55.
Declaration of Aaron Taggart in Support of Defendants Xilinx, Inc. and Avnet, Inc.'s Responsive Claim Construction Brief, Defendants Xilinx, Inc. and Avnet, Inc.'s Responsive Claim Construction Brief (Exhibit A), *PACT XPP Technologies, AG v. Xilinx, Inc. and Avnet, Inc. et al.*, E.D. Texas, 2:07-cv-00563-CE, Dec. 6, 2010, pp. 1-5.
Oral Videotaped Deposition Joseph McAlexander (Oct. 12, 2010), Exhibit 1 of of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-9.
Expert Report of Joe McAlexander re Claim Construction, Exhibit 2 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-137.
Documents from File History of U.S. Appl. No. 09/290,342 (filed Apr. 12, 1999), Exhibit 6 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-181.
Transcript of Harry (Nick) L. Tredennick III, Ph.D., Oct. 11, 2010, vol. 1, Exhibit 7 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-28.
Amendment, Response from File History of U.S. Appl. No. 10/156,397 (filed May 28, 2002), Exhibit 15 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-137.
Application from File History of U.S. Appl. No. 08/544,435 (filed Nov. 17, 1995), Exhibit 20 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-102.
Documents from File History of U.S. Appl. No. 09/329,132 (filed Jun. 9, 1999), Exhibit 24 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-13.
Documents from File History of U.S. Appl. No. 10/791,501 (filed Mar. 1, 2004), Exhibit 25 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-14.
Amendment from File History of U.S. Appl. No. 11/246,617 (filed Oct. 7, 2005), Exhibit 26 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-9.
Documents from File History of U.S. Appl. No. 08/947,254 (filed Oct. 8, 1997), Exhibit 27 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-38.
Documents from File History of U.S. Appl. No. 08/947,254 (filed Oct. 8, 1997), specifically, German priority application specification [English translation provided], Exhibit 33 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, 54 pages [including English translation].
Documents from File History of U.S. Appl. No. 09/335,974 (filed Jun. 18, 1999), Exhibit 28 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-32.
Documents from File History of U.S. Patent Reexamination Control No. 90/010,450 (filed Mar. 27, 2009), Exhibit 30 of Defendants Xilinx, Inc. and Avnet, Inc.'s Responsive Claim Construction Brief; *PACT XPP Technologies, AG v. Xilinx, Inc. and Avnet, Inc. et al.*, E.D. Texas, 2:07-cv-00563-CE, Dec. 6, 2010, pp. 1-71.
Documents from File History of U.S. Appl. No. 10/265,846 (filed Oct. 7, 2002), Exhibit 32 of Defendants Xilinx, Inc. and Avnet, Inc.'s Responsive Claim Construction Brief, *PACT XPP Technologies, AG v. Xilinx, Inc. and Avnet, Inc. et al.*, E.D. Texas, 2:07-cv-00563-CE, Dec. 6, 2010, pp. 1-23.
PACT's Claim Construction Reply Brief, *PACT XPP Technologies, AG v. Xilinx, Inc. and Avnet, Inc. et al.*, E.D. Texas, 2:07-cv-00563-CE, Jan. 7, 2011, pp. 1-20.
Defendants Xilinx, Inc. and Avnet, Inc.'s Claim Construction Sur-reply Brief, *PACT XPP Technologies, AG v. Xilinx, Inc. and Avnet, Inc. et al.*, E.D. Texas, 2:07-cv-00563-CE, Jan. 18, 2011, 142 pages.
Markman Hearing Minutes and Attorney Sign-In Sheet, *PACT XPP Technologies, AG v. Xilinx, Inc. and Avnet, Inc. et al.*, E.D. Texas, 2:07-cv-00563-CE, Feb. 22, 2011, 3 pages; and court transcript, 245 pages.
Memorandum Opinion and Order, *PACT XPP Technologies, AG v. Xilinx, Inc. and Avnet, Inc. et al.*, E.D. Texas, 2:07-cv-00563-CE, Jun. 17, 2011, pp. 1-71.
Atmel Corporation, Atmel 5-K-50K Gates Coprocessor FPGA and FreeRAM, (www.atmel.com), Apr. 2002, pp. 1-68.
Glaskowsky, Peter N., "PACT Debuts Extreme Processor; Reconfigurable ALU Array is Very Powerful—and Very Complex,"
The Insider's Guide to Microprocessor Hardware, MicroDesign Resources—Micoprocessor Report, Oct. 9, 2000 (www.MPRonline.com), 6 pages.
Glaskowsky, Peter N., "Analysis' Choice Nominees Named; Our Picks for 2002's Most Important Products and Technologies," The Insider's Guide to Microprocessor Hardware, MicroDesign Resources—Micoprocessor Report, Dec. 9, 2002 (www.MPRonline.com), 4 pages.
Lattice Semiconductor Corporation, "ispLSI 2000E, 2000VE and 2000 VL Family Architectural Description," Oct. 2001, pp. 1-88.
Olukotun, K. et al., "Rationale, Design and Performance of the Hydra Multiprocessor," Computer Systems Laboratory, Stanford University, CA, Nov. 1994, pp. 1-19.
PACT Corporate Backgrounder, PACT company release, Oct. 2008, 4 pages.
Page, Ian., "Reconfigurable processor architectures," Oxford University Computing Laboratory, Oxford UK, Elsevier Science B.V., Microprocessors and Microsystems 20 (1996) pp. 185-196.
Singh, Hartej et al., "Morpho-Sys: A Reconfigurable Architecture for Multimedia Applications," Univ. of California, Irvine, CA and Federal University of Rio de Janiero, Brazil, IEEE Transactions on Computers, 1998 at http://www.eng.uci.edu/morphosys/docs/sbcci98.html, 10 pages.
Theodoridis, G. et al., "Chapter 2—A Survey of Coarse-Grain Reconfigurable Architectures and Cad Tools, Basic Definitions, Critical Design Issues and Existing Coarse-grain Reconfigurable Systems," from S. Vassiliadis, and D. Soudris (eds.) *Fine- and Coarse-Grained Rerconfigurable Computing*, Springer 2007, pp. 89-149.
Weinhardt, Markus et al., "Using Function Folding to Improve Silicon Efficiency of Reconfigurable Arithmetic Arrays," PACT XPP Technologies AG, Munich, Germany, IEEE 2004, pp. 239-245.
Xilinx, XC6200 Field Programmable Gate Arrays, Advance Product Specification, Jun. 1, 1996 (Version 1.0), pp. 4-255 through 4-286.
Xilinx, Virtex-II Platform FPGA User Guide, UG002 (V2.1) Mar. 28, 2007, pp. 1-502 [Parts 1-3].
Xilinx, XC4000E and SC4000X Serial Field Programmable Gate Arrays, Product Specification (Version 1.6), May 14, 1999, pp. 1-107.
U.S. Appl. No. 60/109,417, filed Nov. 18, 1998, Jefferson et al.
Abnous et al., "Ultra-Low-Power Domain-Specific Multimedia Processors," U.C. Berkeley, 1996 IEEE, pp. 461-470.
Abnous, A., et al., "The Pleiades Architecture," Chapter I of *The Application of Programmable DSPs in Mobile Communications*, A. Gatherer and A. Auslander, Ed., Wiley, 2002, pp. 1-33.
Ade, et al., "Minimum Memory Buffers in DSP Applications," Electronics Letters, vol. 30, No. 6, Mar. 17, 1994, pp. 469-471.
Advanced RISC Machines, "Introduction to AMBA," Oct. 1996, Section 1, pp. 1-7.
ARM, "The Architecture for the Digital World," http://www.arm.com/products/ Mar. 18, 2009, 3 pages.
ARM, "The Architecture for the Digital World; Milestones," http://www.arm.com/aboutarm/milestones.html Mar. 18, 2009, 5 pages.
Albaharna, O.T. et al., "On the Viability of FPGA-Based Integrated Coprocessors," Dept. of Electrical and Electronic Engineering, Imperial College of Science, London, 1999 IEEE, pp. 206-215.
Alippi, et al., "Determining the Optimum Extended Instruction Set Architecture for Application Specific Reconfigurable VLIW CPUs," IEEE, 2001, pp. 50-56.
Altera, "Flex 8000 Programmable Logic Device Family," Altera Corporation product description, Jan. 2003, pp. 1-62.
Altera, "Flex 10K Embedded Programmable Logic Device Family," Altera Corporation product description, Jan. 2003, pp. 1-128.
Arabi, et al., "PLD Integrates Dedicated High-speed Data Buffering, Complex State machine, and Fast Decode Array," conference record on WESCON '93, Sep. 28, 1993, pp. 432-436.
Asari, K. et al., "FeRAM circuit technology for system on a chip," *Proceedings First NASA/DoD Workshop on Evolvable Hardware* (1999), pp. 193-197.
Athanas, "A Functional Reconfigurable Architecture and Compiler for Adoptive Computing," IEEE 1993, pp. 49-55.
Athanas, et al., "An Adaptive Hardware Machine Architecture and Compiler for Dynamic Processor Reconfigugation," IEEE, Laboratory for Engineering man/Machine Systems Division of Engineering, Box D, Brown University, Providence, Rhode Island, 1991, pp. 397-400.
Athanas et al., "Processor Reconfiguration Through Instruction-Set Metamorphosis," 1993, IEEE Computers, pp. 11-18.
Atmel, 5-K-50K Gates Coprocessor FPGA with Free Ram, Data Sheet, Jul. 2006, 55 pages.
Atmel, FPGA-based FIR Filter Application Note, Sep. 1999, 10 pages.
Atmel, "An Introduction to DSP Applications using the AT40K FPGA," FPGA Application Engineering, San Jose, CA, Apr. 2004, 15 pages.
Atmel, Configurable Logic Design & Application Book, Atmel Corporation, 1995, pp. 2-19 through 2-25.
Atmel, Field Programmable Gate Array Configuration Guide, AT6000 Series Configuration Data Sheet, Sep. 1999, pp. 1-20.
Bacon, D. et al., "Compiler Transformations for High-Performance Computing," ACM Computing Surveys, 26(4):325-420 (1994).
Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.
Baumgarte, V. et al., PACT XPP "A Self-reconfigurable Data Processing Architecture," PACT Info. GMBH, Munchen Germany, 2001, 7 pages.
Beck et al., "From control flow to data flow," TR 89-1050, Oct. 1989, Dept. of Computer Science, Cornell University, Ithaca, NY, pp. 1-25.
Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).
Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).
Becker et al., "Automatic Parallelism Exploitation for FPL-Based Accelerators," 1998, Proc. 31$^{st}$ Annual Hawaii International Conference on System Sciences, pp. 169-178.
Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.
Bittner, "Wormhole Run-time Reconfiguration: Conceptualization and VLSI Design of a High Performance Computing System," *Dissertation*, Jan. 23, 1997, pp. I-XX, 1-415.
Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.
Cadambi, et al., "Managing Pipeline-reconfigurable FPGAs," ACM, 1998, pp. 55-64.
Callahan, et al., "The Garp Architecture and C Compiler," Computer, Apr. 2000, pp. 62-69.
Cardoso, J.M.P., et al., "A novel algorithm combining temporal partitioning and sharing of functional units," University of Algarve, Faro, Portugal, 2001 IEEE, pp. 1-10.
Cardoso, Joao M.P., and Markus Weinhardt, "XPP-VC: A C Compiler with Temporal Partitioning for the PACT-XPP Architecture," Field-Programmable Logic and Applications. Reconfigurable Computing is Going Mainstream, 12$^{th}$ International Conference FPL 2002, Proceedings (Lecture Notes in Computer Science, vol. 2438) Springer-Verlag Berlin, Germany, 2002, pp. 864-874.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and English Abstract only).
Cardoso, J.M.P., et al., "Compilation and Temporal Partitioning for a Coarse-Grain Reconfigurable Architecture," New Algorithms, Architectures and Applications for Reconfigurable Computing, Lysacht, P. & Rosentiel, W. eds., (2005) pp. 105-115.
Cardoso, J.M.P., et al., "Macro-Based Hardware Compilation of Java™ Bytecodes into a Dynamic Reconfigurable Computing System," Field-Programmable Custom Computing Machines (1999)

FCCM '99. Proceedings. Seventh Annual IEEE Symposium on NAPA Valley, CA, USA, Apr. 21-23, 1999, IEEE Comput. Soc, US, (Apr. 21, 1999) pp. 2-11.
Chaudhry, G.M., et al., "Separated caches and buses for multiprocessor system," Circuits and Systems, 1993; Proceedings of the 36th Midwest Symposium on Detroit, MI, USA, Aug. 16-18, 1993, New York, NY IEEE, Aug. 16, 1993, pp. 1113-1116, XP010119918 ISBN: 0-7803-1760-2.
Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.
Clearspeed, CSX Processor Architecture, Whitepaper, PN-1110-0702, 2007, pp. 1-15, www.clearspeed.com.
Clearspeed, CSX Processor Architecture, Whitepaper, PN-1110-0306, 2006, pp. 1-14, www.clearspeed.com.
Compton, K., et al., "Configurable Computing: A Survey of Systems and Software," Northwestern University, Dept. of ECE, Technical Report, 1999, (XP-002315148), 39 pages.
Cook, Jeffrey J., "The Amalgam Compiler Infrastructure," Thesis at the University of Illinois at Urbana-Champaign (2004) Chapter 7 & Appendix G.
Cronquist, D., et al., Architecture Design of Reconfigurable Pipelined Datapaths, Department of Computer Science and Engineering, University of Washington, Seattle, WA, Proceedings of the 20$^{th}$ Anniversary Conference on Advanced Research in VSLI, 1999, pp. 1-15.
Culler, D.E; Singh, J.P., "Parallel Computer Architecture," pp. 434-437, 1999, Morgan Kaufmann, San Francisco, CA USA, XP002477559.
DeIIon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.
DeHon, Andre, "Reconfigurable Architectures for General-Purpose Computing," Massachusetts Institute of Technology, Technical Report AITR-1586, Oct. 1996, XP002445054, Cambridge, MA, pp. 1-353.
Del Corso et al., "Microcomputer Buses and Links," Academic Press Inc. Ltd., 1986, pp. 138-143, 277-285.
Diniz, P., et al., "Automatic Synthesis of Data Storage and Control Structures for FPGA-based Computing Engines," 2000, IEEE, pp. 91-100.
Diniz, P., et al., "A behavioral synthesis estimation interface for configurable computing," University of Southern California, Marina Del Rey, CA, 2001 IEEE, pp. 1-2.
Donandt, "Improving Response Time of Programmable Logic Controllers by use of a Boolean Coprocessor," AEG Research Institute Berlin, IEEE, 1989, pp. 4-167-4-169.
Dutt, et al., "If Software is King for Systems-in-Silicon, What's New in Compilers?" IEEE, 1997, pp. 322-325.
Ebeling, C., et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.
Equator, Pixels to Packets, Enabling Multi-Format High Definition Video, Equator Technologies BSP-15 Product Brief, www.equator.com, 2001, 4 pages.
Fawcett, B.K., "Map, Place and Route: The Key to High-Density PLD Implementation," Wescon Conference, IEEE Center (Nov. 7, 1995) pp. 292-297.
Ferrante, J., et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.
Fornaciari, et al., System-level power evaluation metrics, 1997 Proceedings of the 2$^{nd}$ Annual IEEE International Conference on Innovative Systems in Silicon, New York, NY, Oct. 1997, pp. 323-330.

Forstner, "Wer Zuerst Kommt, Mahlt Zuerst!: Teil 3: Einsatzgebiete and Anwendungbeispiele von FIFO-Speichern," Elektronik, Aug. 2000, pp. 104-109.

Franklin, Manoj, et al., "A Fill-Unit Approach to Multiple Instruction Issue," Proceedings of the Annual International Symposium on Microarchitecture, Nov. 1994, pp. 162-171.

Freescale Slide Presentation, An Introduction to Motorola's RCF (Reconfigurable Compute Fabric) Technology, Presented by Frank David, Launched by Freescale Semiconductor, Inc., 2004, 39 pages.

Genius, D., et al., "A Case for Array Merging in Memory Hierarchies," Proceedings of the 9th International Workshop on Compilers for Parallel Computers, CPC'01 (Jun. 2001), 10 pages.

Gokhale, M.B., et al., "Automatic Allocation of Arrays to Memories in FPGA processors with Multiple Memory Banks," Field-Programmable Custom Computing Machines, 1999, IEEE, pp. 63-69.

Hammes, Jeff, et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R. et al., "A new FPGA architecture for word-oriented datapaths," Proc. FPL'94, Springer LNCS, Sep. 1994, pp. 144-155.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).

Hauck, "The Roles of FPGAs in Reprogrammable Systems," IEEE, Apr. 1998, pp. 615-638.

Hauser, J.R., et al., "Garp: A MIPS Processor with a Reconfigurable Coprocessor," University of California, Berkeley, IEEE, 1997, pp. 24-33.

Hedge, S.J., "3D WASP Devices for On-line Signal and Data Processing," 1994, International Conference on Wafer Scale Integration, pp. 11-21.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Advanced Computer Architecture—Parallelism, Scalability, Programmability," 1993, McGraw-Hill, Inc., pp. 348-355.

Hwang, K., "Computer Architecture and Parallel Processing," Data Flow Computers and VLSI Computations, XP-002418655, 1985 McGraw-Hill, Chapter 10, pp. 732-807.

Hwang, L., et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

IBM Technical Disclosure Bulletin, IBM Corp., New York, XP000424878, Bd. 36, Nr. 11, Nov. 1, 1993, pp. 335-336.

"IEEE Standard Test Access Port and Boundary-Scan Architecture," IEEE Std. 1149.1-1990, 1993, pp. 1-127.

Inside DSP, "Ambric Discloses Massively Parallel Architecture," Aug. 23, 2006, http://www.insidedsp.com/ Articles/tabid/64/articleType/ArticleView/articleId/155/Default.aspx, 2 pages.

Intel, Intel MXP5800/MXP5400 Digital Media Processors, Architecture Overview, Jun. 2004, Revision 2.4, pp. 1-24.

Iseli, C., et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

Jantsch, Axel, et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Kaul, M., et al., "An automated temporal partitioning and loop fission approach of FPGA based reconfigurable synthesis of DSP applications," University of Cincinnati, Cincinnati, OH, ACM 1999, pp. 616-622.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the $6^{th}$ International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Knittel, Gunter, "A PCI-compatible FPGA-Coprocessor for 2D/3D Image Processing," University of Turgingen, Germany, 1996 IEEE, pp. 136-145.

Koch, A., et al., "Practical Experiences with the SPARXIL Co-Processor," 1998, IEEE, pp. 394-398.

Koch, Andreas et al., "High-Level-Language Compilation for Reconfigurable Computers," Proceedings of European Workshop on Reconfigurable Communication-Centric SOCS (Jun. 2005) 8 pages.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the $15^{th}$ Annual International Symposium on Computer Architecture, May 30, 1998, pp. 252-260.

Lange, H., et al., "Memory access schemes for configurable processors," Field-Programmable Logic and Applications, International Workshop, FPL, Aug. 27, 2000, pp. 615-625, XP02283963.

Larsen, S., et al., "Increasing and Detecting Memory Address Congruence," Proceedings of the 2002 IEEE International Conference on Parallel Architectures and Compilation Techniques (PACT'02), pp. 1-12 (Sep. 2002).

Lee et al., "A new distribution network based on controlled switching elements and its applications," IEEE/ACT Trans. of Networking, vol. 3, No. 1, pp. 70-81, Feb. 1995.

Lee, Jong-eun, et al., "Reconfigurable ALU Array Architecture with Conditional Execution," International Soc. Design Conference (ISOOC) [online] Oct. 25, 2004, Seoul, Korea, 5 pages.

Lee, Ming-Hau, et al., "Designs and Implementation of the MorphoSys Reconfigurable Computing Processors," The Journal of VLSI Signal Processing, Kluwer Academic Publishers, BO, vol. 24, No. 2-3, Mar. 2, 2000, pp. 1-29.

Lee, R. B., et al., "Multimedia extensions for general-purpose processors," *IEEE Workshop on Signal Processing Systems, SIPS 97—Design and Implementation* (1997), pp. 9-23.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317.

Mano, M.M., "Digital Design," by Prentice Hall, Inc., Englewood Cliffs, New Jersey 07632, 1984, pp. 119-125, 154-161.

Margolus, N., "An FPGA architecture for DRAM-based systolic computations," Boston University Center for Computational Science and MIT Artificial Intelligence Laboratory, IEEE 1997, pp. 2-11.

Maxfield,C., "Logic that Mutates While-U-Wait," EDN (Bur. Ed) (USA), EDN (European Edition), Nov. 7, 1996, Cahners Publishing, USA, pp. 137-140, 142.

Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).

Mei, Bingfeng et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Mei, Bingfeng, et al., "Adres: An Architecture with Tightly Coupled VLIW Processor and Coarse-Grained Reconfigurable Matrix," Proc. *Field-Programmable Logic and Applications* (FPL 03), Springer, 2003, pp. 61-70.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Miyamori, T., et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation," (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Myers, G. "Advances in Computer Architecture," Wiley-Interscience Publication, 2nd ed., John Wiley & Sons, Inc., 1978, pp. 463-494.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, 11th International Conference, FPL 2001, Proceedings (Lecture Notes in Computer Science, vol. 2147) (2001) pp. 503-512.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Olukotun, K., "The Case for a Single-Chip Microprocessor," ACM Sigplan Notices, ACM, Association for Computing Machinery, New York, vol. 31, No. 9, Sep. 1996 pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

PCI Local Bus Specification, Production Version, Revision 2.1, Jun. 1, Portland, OR, 1995, pp. 1-281.

Piotrowski, A., "IEC-BUS, Die Funktionsweise des IEC-Bus unde seine Anwendung in Geräten und Systemen," 1987, Franzis-Verlag GmbH, München, pp. 20-25.

Pirsch, P. et al., "VLSI implementations of image and video multimedia processing systems," *IEEE Transactions on Circuits and Systems for Video Technology*, vol. 8, No. 7, Nov. 1998, pp. 878-891.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Razdan et al., A High-Performance Microarchitecture with Hardware-Programmable Functional Units, Micro-27, Proceedings of the 27th Annual International Symposium on Microarchitecture, IEEE Computer Society and Association for Computing Machinery, Nov. 30-Dec. 2, 1994, pp. 172-180.

Ryo, A., "Auszug aus Handbuch der Informationsverarbeitung," ed. Information Processing Society of Japan, *Information Processing Handbook, New Edition*, Software Information Center, Ohmsha, Dec. 1998, 4 pages. [Translation provided].

Saleeba, Z.M.G., "A Self-Reconfiguring Computer System," Department of Computer Science, Monash University (Dissertation) 1998, pp. 1-306.

Saleeba, M. "A Self-Contained Dynamically Reconfigurable Processor Architecture," Sixteenth Australian Computer Science Conference, ASCS-16, QLD, Australia, Feb. 1993, pp. 59-70.

Salefski, B. et al., "Re-configurable computing in wireless," *Annual ACM IEEE Design Automation Conference: Proceedings of the 38th conference on Design automation* (2001) pp. 178-183.

Schmidt, H. et al., "Behavioral synthesis for FGPA-based computing," Carnegie Mellon University, Pittsburgh, PA, 1994 IEEE, pp. 125-132.

Schmidt, U. et al., "Datawave: A Single-Chip Multiprocessor for Video Applications," *IEEE Micro*, vol. 11, No. 3, May/Jun. 1991, pp. 22-25, 88-94.

Schmit, et al., "Hidden Markov Modeling and Fuzzy Controllers in FPGAs, FPGAs for Custom Computing Machines," 1995; Proceedings, IEEE Symposium in Napa Valley, CA, Apr. 1995, pp. 214-221.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers, C., "Rechenfabrik Ansaetze Fuer Extrem Parallele Prozessoren," Verlag Heinze Heise GmbH., Hannover, DE No. 15, Jul. 16, 2001, pp. 170-179.

Siemers et al., "The .>S<puter: A Novel Micoarchitecture Model for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Simunic, et al., Source Code Optimization and Profiling of Energy Consumation in Embedded Systems, Proceedings of the 13th International Symposium on System Synthesis, Sep. 2000, pp. 193-198.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Skokan, Z.E., "Programmable logic machine (A programmable cell array)," IEEE Journal of Solid-State Circuits, vol. 18, Issue 5, Oct. 1983, pp. 572-578.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Sutton et al., "A Multiprocessor DSP System Using PADDI-2," U.C. Berkeley, 1998 ACM, pp. 62-65.

Tau, E., et al., "A First Generation DPGA Implementation," *FPD '95*, pp. 138-143.

Tenca, A.F., et al., "A Variable Long-Precision Arithmetic Unit Design for Reconfigurable Coprocessor Architectures," University of California, Los Angeles, 1998, pp. 216-225.

The XPP White Paper, Release 2.1, PACT—A Technical Perspective, Mar. 27, 2002, pp. 1-27.
TMS320C54X DSP: CPU and Peripherals, Texas Instruments, 1996, 25 pages.
TMS320C54x DSP: Mnemonic Instruct on Set, Texas Instruments, 1996, 342 pages.
Tsutsui, A., et al., "Yards: FPGA/MPU Hybrid Architecture for Telecommunication Data Processing," NTT Optical Network Systems Laboratories, Japan, 1997 ACM, pp. 93-99.
Vasell et al., "The Function Processor: A Data-Driven Processor Array for Irregular Computations," Chalmers University of Technology, Sweden, 1992, pp. 1-21.
Villasenor, et al., "Configurable Computing Solutions for Automatic Target Recognition," *IEEE*, 1996 pp. 70-79.
Villasenor, et al., "Configurable Computing," *Scientific American*, vol. 276, No. 6, Jun. 1997, pp. 66-71.
Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.
Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.
Waingold, E., et al., "Baring it all to software: Raw machines," IEEE Computer, Sep. 1997, at 86-93.
Weinhardt, M., "Compilation Methods for Structure-programmable Computers," dissertation, ISBN 3-89722-011-3, 1997. [Table of Contents and English Abstract Provided].
Weinhardt, Markus et al., "Pipeline Vectorization for Reconfigurable Systems," 1999, IEEE, pp. 52-62.
Weinhardt, Markus et al., "Pipeline Vectorization," IEEE Transactions on Computer-Aided Design of Integrated Circuits and Systems, vol. 20, No. 2, Feb. 2001, pp. 234-248.
Weinhardt, Markus et al., "Memory Access Optimization for Reconfigurable Systems," IEEE Proceedings Computers and Digital Techniques, 48(3) (May 2001) pp. 1-16.
Wittig, et al., "OneChip: An FPGA Processor with Reconfigurable Logic," IEEE, 1996, pp. 126-135.
Wolfe, M. et al., "High Performance Compilers for Parallel Computing," (Addison-Wesley 1996) Table of Contents, 11 pages.
Wu, et al., "A New Cache Directory Scheme," IEEE, pp. 466-472, Jun. 1996.
Xilinx, "Logic Cell Array Families: XC4000, XC4000A and XC4000H," 1994, product description, pp. 2-7, 2-9, 2-14, 2-15, 8-16, and 9-14.
Xilinx, "The Programmable Logic Data Book," 1994, Section 2, pp. 1-231, Section 8, pp. 1, 23-25, 29, 45-52, 169-172.
Xilinx, "Spartan and SpartanXL Families Field Programmable Gate Arrays," Jan. 1999, Xilinx, pp. 4-3 through 4-70.
Xilinx, "XC6200 Field Programmable Gate Arrays," Apr. 24, 1997, Xilinx product description, pp. 1-73.
Xilinx, "XC3000 Series Field Programmable Gate Arrays," Nov. 6, 1998, Xilinx product description, pp. 1-76.
Xilinx, "XC4000E and XC4000X Series Field Programmable Gate Arrays," May 14, 1999, Xilinx product description, pp. 1-68.
Xilinx, "Virtex-E 1.8 V Extended Memory Field Programmable Gate Arrays," Jul. 17, 2002, Xilinx Production Product Specification, pp. 1-118.
Xilinx, "Virtex-II and Virtex-II Pro X FPGA User Guide," Mar. 28, 2007, Xilinx user guide, pp. 1-559.
Xu, H. et al., "Parallel QR Factorization on a Block Data Flow Architecture," Conference Proceeding Article, Mar. 1, 1992, pp. 332-336 XPO10255276, p. 333, Abstract 2.2, 2.3, 2.4—p. 334.
Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.
Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.
Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.
Zhang, et al., "Architectural Evaluation of Flexible Digital Signal Processing for Wireless Receivers, Signals, Systems and Computers," 2000; Conference Record of the Thirty-Fourth Asilomar Conference, Bd. 1, Oct. 29, 2000, pp. 78-83.
Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.
Zhang et al., "Abstract: Low-Power Heterogeneous Reconfigurable Digital Signal Processors with Energy-Efficient Interconnect Network," U.C. Berkeley (2004), pp. 1-120.
Zima, H. et al., "Supercompilers for parallel and vector computers," (Addison-Wesley 1991) Table of Contents, 5 pages.
U.S. Appl. No. 90/010,979, filed May 4, 2010, Vorbach et al.
U.S. Appl. No. 90/011,087, filed Jul. 8, 2010, Vorbach et al.
Hauser, John Reid, (Dissertation) "Augmenting a Microprocessor with Reconfigurable Hardware," University of California, Berkeley, Fall 2000, 255 pages. (submitted in 3 PDFs, Parts 1-3).
Hauser, John R., "The Garp Architecture,"University of California at Berkeley, Computer Science Division, Oct. 1997, pp. 1-55.
Venkatachalam et al., "A highly flexible, distributed multiprocessor architecture for network processing," Computer Networks, The International Journal of Computer and Telecommunications Networking, vol. 41, No. 5, Apr. 5, 2003, pp. 563-568.
Xilinx, Inc.'s and Avnet, Inc.'s Disclosure Pursuant to P.R. 4-2; *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, 4 pages.
Xilinx, Inc.'s and Avnet, Inc.'s Disclosure Pursuant to P.R. 4-1; *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, 9 pages.
Defendant's Claim Construction Chart for P.R. 4-2 Constructions and Extrinsic Evidence for Terms Proposed by Defendants, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-19.
PACT's P.R. 4-1 List of Claim Terms for Construction, *PACT XPP Technologies, AG. V. Xilinx, Inc and Avnet, Inc.*, Case No. 2:07-cv-00563-TJW-CE, U.S. District Court for the Eastern District of Texas, Dec. 28, 2007, pp. 1-7.
PACT's P.R. 4-2 Preliminary Claim Constructions and Extrinsic Evidence, *PACT XPP Technologies, AG. V. Xilinx, Inc. and Avnet, Inc.*, Case No. 2:07-cv-00563-TJW-CE, U.S. District Court for the Eastern District of Texas, Dec. 28, 2007, pp. 1-16, and Exhibits re Extrinsic Evidence Parts in seven (7) separate additional PDF files (Parts 1-7).
Altera, "APEX 20K Programmable Logic Device Family," Altera Corporation Data Sheet, Mar. 2004, ver. 5.1, pp. 1-117.
IMEC, "ADRES multimedia processor & 3MF multimedia platform," Transferable IP, IMEC Technology Description, (Applicants believe the date to be Oct. 2005), 3 pages.
Kanter, David, "NVIDIA's GT200: Inside a Parallel Processor," http://www.realworldtech.com/page.cfm?ArticleID=RWT090989195242&p=1, Sep. 8, 2008, 27 pages.
Xilinx, "Virtex-E 1.8 V Extended Memory Field Programmable Gate Arrays," (v2.2) Sep. 10, 2002, Xilinx Production Product Specification, pp. 1-52.
Xilinx, "Virtex-II and Virtex-II Pro X FPGA Platform FPGAs: Complete Data Sheet," (v4.6) Mar. 5, 2007, pp. 1-302.
Xilinx, "Virtex-II Platform FPGAs: Complete Data Sheet," (v3.5) Nov. 5, 2007, pp. 1-226.
ARM Limited, "ARM Architecture Reference Manual," Dec. 6, 2000, pp. A10-6-A10-7.
Bondalapati et al., "Reconfigurable Meshes: Theory and Practice," Dept. of Electrical Engineering-Systems, Univ. of Southern California, Apr. 1997, Reconfigurable Architectures Workshop, International Parallel Processing Symposium, 15 pages.

Cherbaka, Mark F., "Verification and Configuration of a Run-time Reconfigurable Custom Computing Integrated Circuit for DSP Applications," Thesis: Virginia Polytechnic Institute and State University, Jul. 8, 1996, 106 pages.

Cong et al., "Structural Gate Decomposition for Depth-Optimal Technology Mapping in LUT-Based FPGA Designs," Univ. of California, ACM Transactions on Design Automation of Electronic Systems, vol. 5, No. 2, Apr. 2000, pp. 193-225.

FOLDOC, The Free On-Line Dictionary of Computing, "handshaking," online Jan. 13, 1995, retrieved from Internet Jan. 23, 2011 at http://foldoc.org/handshake.

Li et al., "Hardware-Software Co-Design of Embedded Reconfigurable Architectures," Los Angeles, CA, 2000, ACM, pp. 507-512.

Marshall et al., "A Reconfigurable Arithmetic Array for Multimedia Applications," FPGA '99 Proceedings of the 1999 ACM/SIGDA Seventh International Symposium on Field Programmable Gate Arrays, 10 pages.

Melvin, Stephen et al., "Hardware Support for Large Atomic Units in Dynamically Scheduled Machines," Computer Science Division, University of California, Berkeley, IEEE (1988), pp. 60-63.

Pistorius et al., "Generation of Very Large Circuits to Benchmark the Partitioning of FPGAs," Monterey, CA, 1999, ACM, pp. 67-73.

Roterberg, Eric., et al., "Trace Cache: a Low Latency Approach to High Bandwidth Instruction Fetching," Proceedings of the $29^{th}$ Annual International Symposium on Michoarchitecture, Paris, France, IEEE (1996), 12 pages.

Translation of DE 101 39 170 by examiner using Google Translate, 10 pages.

U.S. Appl. No. 90/010,450, filed Mar. 27, 2009.

Culler, D.E; Singh, J.P., "Parallel Computer Architecture," p. 17, 1999, Morgan Kaufmann, San Francisco, CA USA, XP002477559.

Short, Kenneth L., *Microprocessors and Programmed Logic*, Prentice Hall, Inc., New Jersey 1981, p. 34.

Webster's Ninth New Collegiate Dictionary, Merriam-Webster, Inc., 1990, p. 332 (definition of "dedicated").

Huang, Libo et al., "A New Architecture for Multiple-Precision Floating-Point Multiply-Add Fused Unit Design," School of Computer National University of Defense Technology, China, IEEE 2007, 8 pages.

Jo, Manhwee et al., "Implementation of Floating-Point Operations for 3D Graphics on a Coarse-Grained Reconfigurable Architecture," Design Automation Laboratory, School of EE/CS, Seoul National University, Korea, IEEE 2007, pp. 127-130.

Xilinx, White Paper 370: (Virtex-6 and Spartan-6 FPGA Families) "Reducing Switching Power with Intelligent Clock Gating," Frederic Rivoallon, May 3, 2010, pp. 1-5.

Xilinx, White Paper 298: (Spartan-6 and Virtex-6 Devices) "Power Consumption at 40 and 50 nm," Matt Klein, Apr. 13, 2009, pp. 1-21.

Becker, J., "A Partitioning Compiler for Computers with Xputer-based Accelerators," 1997, Kaiserslautern University, 326 pp.

Hartenstein et al., "Parallelizing Compilation for a Novel Data-Parallel Architecture," 1995, PCAT-94, Parallel Computing: Technology and Practice, 13 pp.

Hartenstein et al., "A Two-Level Co-Design Framework for Xputer-based Data-driven Reconfigurable Accelerators," 1997, Proceedings of the Thirtieth Annual Hawaii International Conference on System Sciences, 10 pp.

Ballagh et al., "Java Debug Hardware Models Using JBits," $8^{th}$ Reconfigurable Architectures Workshop, 2001, 8 pages.

Bellows et al., "Designing Run-Time Reconfigurable Systems with JHDL," Journal of VLSI Signal Processing, vol. 28, Kluwer Academic Publishers, The Netherlands, 2001, pp. 29-45.

Guccione et al., "JBits: Java based interface for reconfigurable computing," Xilinx, Inc., San Jose, CA, 1999, 9 pages.

Price et al., "Debug of Reconfigurable Systems," Xilinx, Inc., San Jose, CA, Proceedings of SPIE, 2000, pp. 181-187.

Sundararajan et al., "Testing FPGA Devices. Using JBits," Proc. MAPLD 2001, Maryland, USA, Katz (ed.), NASA, CA, 8 pages.

Altera, "Implementing High-Speed Search Applications with Altera CAM," Jul. 2001, Ver. 2.1, Application Note 119, 50 pages.

Bolsens, Ivo (CTO Xilinx), "FPGA, a history of interconnect," Xilinx slide presentation, posted on the internet Oct. 30, 2008 at http://www.docstoc.com/docs/2198008/FPGA-a-history-of-interconnect, 32 pages.

Altera, "2. TriMatrix Embedded Memory Blocks in Stratix & Stratix GX Devices," Altera Corporation, Jul. 2005, 28 pages.

Altera, "APEX II Programmable Logic Device Family," Altera Corporation Data Sheet, Aug. 2002, Ver. 3.0, 99 pages.

"BlueGene/L—Hardware Architecture Overview," BlueGene/L design team, IBM Research, Oct. 17, 2003 slide presentation, pp. 1-23.

"BlueGene/L: the next generation of scalable supercomputer," Kissel et al., Lawrence Livermore National Laboratory, Livermore, California, Nov. 18, 2002, 29 pages.

BlueGene Project Update, Jan. 2002, IBM slide presentation, 20 pages.

BlueGene/L, "An Overview of the BlueGene/L Supercomputer," The BlueGene/L Team, IBM and Lawrence Livermore National Laboratory, 2002 IEEE. pp. 1-22.

Epstein, Dave, "IBM Extends DSP Performance with Mfaxt," Microprocessor Report, vol. 9, No. 16 (MicroDesign Resources), Dec. 4, 1995, pp. 1-4 [XL0029013].

Galanis, M.D. et al., "Accelerating Applications by Mapping Critical Kernels on Coarse-Grain Reconfigurable Hardware in Hybrid Systems," Proceedings of the $13^{th}$ Annual IEEE Symposium on Field-Programmable Custom Computing Machines, 2005, 2 pages.

Guo, Z. et al., "A Compiler Intermediate Representation for Reconfigurable Fabrics," University of California, Riverside, Dept. of Electrical Engineering, IEEE 2006, 4 pages.

Gwennap, Linley, "P6 Underscores Intel's Lead," Microprocessor Report, vol. 9., No. 2, Feb. 16, 1995 (MicroDesign Resources), p. 1 and pp. 6-15.

Gwennap, Linley, "Intel's P6 Bus Designed for Multiprocessing," Microprocessor Report, vol. 9, No. 7 (MicroDesign Resources), May 30, 1995, p. 1 and pp. 6-10.

Intel, "Pentium Pro Family Developer's Manual , vol. 3: Operating System Writer's Guide," Intel Corporation, Dec. 1995, [submitted in 4 PDF files: Part I, Part II, Part III and Part IV], 458 pages.

Agarwal, A., et al., "APRIL: A Processor Architecture for Multiprocessing," Laboratory for Computer Science, MIT, Cambridge, MA, IEEE 1990, pp. 104-114.

Almasi and Gottlieb, *Highly Parallel Computing*, The Benjamin/Cummings Publishing Company, Inc., Redwood City, CA, 1989, 3 pages (Fig. 4.1).

Advanced RISC Machines Ltd (ARM), "AMBA—Advanced Microcontroller Bus Architecture Specification," (Document No. ARM IHI 0001C), Sep. 1995, 72 pages.

Alfke, Peter; New, Bernie, *Xilinx Application Note*, "Additional XC3000 Data," XAPP 024.000, 1994, pp. 8-11 through 8-20.

Alfke, Peter; New, Bernie, *Xilinx Application Note*, "Adders, Subtracters and Accumulators in XC3000," XAPP 022.000, 1994, pp. 8-98 through 8-104.

Alfke, Peter, *Xilinx Application Note*, "Megabit FIFO in Two Chips: One LCA Device and One DRAM," XAPP 030.000, 1994, pp. 8-148 through 8-150.

Alfke, Peter, *Xilinx Application Note*, "Dynamic Reconfiguration," XAPP 093, Nov. 10, 1997, pp. 13-45 through 13-46.

Alfke, Peter; New, Bernie, *Xilinx Application Note*, "Implementing State Machines in LCA Devices," XAPP 027.001, 1994, pp. 8-169 through 8-172.

Algotronix, Ltd., CAL64K Preliminary Data Sheet, Apr. 1989, pp. 1-24.

Algotronix, Ltd., CAL4096 Datasheet, 1992, pp. 1-53.

Algotronix, Ltd., CHS2x4 User Manual, "CHA2x4 Custom Computer," 1991, pp. 1-38.

Allaire, Bill; Fischer, Bud, *Xilinx Application Note*, "Block Adaptive Filter," XAPP 055, Aug. 15, 1996 (Version 1.0), pp. 1-10.

Altera Application Note (73), "Implementing FIR Filters in FLEX Devices," Altera Corporation, Feb. 1998, ver. 1.01, pp. 1-23.

Athanas, P. (Thesis), "An adaptive machine architecture and compiler for dynamic processor reconfiguration," Brown University 1992, pp. 1-157.

Berkeley Design Technology, Inc., *Buyer's Guide to DSP Processors*, 1995, Fremont, CA., pp. 673-698.
Bittner, R. et al., "Colt: An Experiment in Wormhole Run-Time Reconfiguration," Bradley Department of Electrical and Computer Engineering, Blacksburg, VA, SPIE—International Society for Optical Engineering, vol. 2914/187, Nov. 1996, Boston, MA, pp. 187-194.
Camilleri, Nick; Lockhard, Chris, *Xilinx Application Note*, "Improving XC4000 Design Performance," XAPP 043.000,1994, pp. 8-21 through 8-35.
Cartier, Lois, *Xilinx Application Note*, "System Design with New XC4000EX I/O Features," Feb. 21, 1996, pp. 1-8.
Chen, D., (Thesis) "Programmable arithmetic devices for high speed digital signal processing," U. California Berkeley 1992, pp. 1-175.
Churcher, S., et al., "The XC6200 FastMap TM Processor Interface," Xilinx, Inc., Aug. 1995, pp. 1-8.
Cowie, Beth, *Xilinx Application Note*, "High Performance, Low Area, Interpolator Design for the XC6200," XAPP 081, May 7, 1997 (Version 1.0), pp. 1-10.
Duncan, Ann, *Xilinx Application Note*, "A32x16 Reconfigurable Correlator for the XC6200," XAPP 084, Jul. 25, 1997 (Version 1.0), pp. 1-14.
Ebeling, C., et al., "RaPiD—Reconfigurable Pipelined Datapath," Dept. of Computer Science and Engineering, U. Washington, 1996, pp. 126-135.
Epstein, D., "IBM Extends DSP Performance with Mfast—Powerful Chip Uses Mesh Architecture to Accelerate Graphics, Video," 1995 MicroDesign Resources, vol. 9, No. 16, Dec. 4, 1995, pp. 231-236.
Fawcett, B., "New SRAM-Based FPGA Architectures Address New Applications," Xilinx, Inc. San Jose, CA, Nov. 1995, pp. 231-236.
Goslin, G; Newgard, B, *Xilinx Application Note*, "16-Tap, 8-Bit FIR Filter Applications Guide," Nov. 21, 1994, pp. 1-5.
Iwanczuk, Roman, *Xilinx Application Note*, "Using the XC4000 RAM Capability," XAPP 031.000, 1994, pp. 8-127 through 8-138.
Knapp, Steven, "Using Programmable Logic to Accelerate DSP Functions," Xilinx, Inc., 1995, pp. 1-8.
New, Bernie, *Xilinx Application Note*, "Accelerating Loadable Counters in SC4000," XAPP 023.001, 1994, pp. 8-82 through 8-85.
New, Bernie,*Xilinx Application Note*, "Boundary Scan Emulator for XC3000," XAPP 007.001, 1994, pp. 8-53 through 8-59.
New, Bernie, *Xilinx Application Note*, "Ultra-Fast Synchronous Counters," XAPP 014.001, 1994, pp. 8-78 through 8-81.
New, Bernie, *Xilinx Application Note*, "Using the Dedicated Carry Logic in XC4000," XAPP 013.001, 1994, pp. 8-105 through 8-115.
New, Bernie, *Xilinx Application Note*, "Complex Digital Waveform Generator," XAPP 008.002, 1994, pp. 8-163 through 8-164.
New, Bernie, *Xilinx Application Note*, "Bus-Structured Serial Input-Output Device," XAPP 010.001, 1994, pp. 8-181 through 8-182.
Ridgeway, David, *Xilinx Application Note*, "Designing Complex 2-Dimensional Convolution Filters," XAPP 037.000, 1994, pp. 8-175 through 8-177.
Rowson, J., et al., "Second-generation compilers optimize semicustom circuits," Electronic Design, Feb. 19, 1987, pp. 92-96.
Schewel, J., "A Hardware/Software Co-Design System using Configurable Computing Technology," Virtual Computer Corporation, Reseda, CA, IEEE 1998, pp. 620-625.
Segers, Dennis, Xilinx Memorandum, "MIKE—Product Description and MRD," Jun. 8, 1994, pp. 1-29.
Texas Instruments, "TMS320C8x System-Level Synopsis," Sep. 1995, 75 pages.
Texas Instruments, "TMS320C80 Digital Signal Processor," Data Sheet, Digital Signal Processing Solutions 1997, 171 pages.
Texas Instruments, "TMS320C80 (MVP) Parallel Processor," User's Guide, Digital Signal Processing Products 1995, 73 pages.
Trainor, D.W., et al., "Implementation of the 2D DCT Using a Xilinx XC6264 FPGA," 1997, IEEE Workshop of Signal Processing Systems SiPS 97, pp. 541-550.
Trimberger, S, (Ed.) et al., "Field-Programmable Gate Array Technology," 1994, Kluwer Academic Press, pp. 1-258 (and the Title Page, Table of Contents, and Preface) [274 pages total].
Trimberger, S., "A Reprogrammable Gate Array and Applications," IEEE 1993, Proceedings of the IEEE, vol. 81, No. 7, Jul. 1993, pp. 1030-1041.
Trimberger, S., et al., "A Time-Multiplexed FPGA," Xilinx, Inc., 1997 IEEE, pp. 22-28.
Ujvari, Dan, *Xilinx Application Note*, "Digital Mixer in an XC7272," XAPP 035.002, 1994, p. 1.
Veendrick, H., et al., "A 1.5 GIPS video signal processor (VSP)," Philips Research Laboratories, The Netherlands, IEEE 1994 Custom Integrated Circuits Conference, pp. 95-98.
Wilkie, Bill, *Xilinx Application Note*, "Interfacing XC6200 to Microprocessors (TMS320C50 Example)," XAPP 064, Oct. 9, 1996 (Version 1.1), pp. 1-9.
Wilkie, Bill, *Xilinx Application Note*, "Interfacing XC6200 to Microprocessors (MC68020 Example)," XAPP 063, Oct. 9, 1996 (Version 1.1), pp. 1-8.
XCELL, Issue 18, Third Quarter 1995, "Introducing three new FPGA Families!"; "Introducing the XC6200 FPGA Architecture: The First FPGA Architecture Optimized for Coprocessing in Embedded System Applications," 40 pages.
*Xilinx Application Note*, Advanced Product Specification, "XC6200 Field Programmable Gate Arrays," Jun. 1, 1996 (Version 1.0), pp. 4-253-4-286.
*Xilinx Application Note*, A Fast Constant Coefficient Multiplier for the XC6200, XAPP 082, Aug. 24, 1997 (Version 1.0), pp. 1-5.
Xilinx Technical Data, "XC5200 Logic Cell Array Family," Preliminary (v1.0), Apr. 1995, pp. 1-43.
Xilinx Data Book, "The Programmable Logic Data Book," 1996, 909 pages.
Xilinx, Series 6000 User's Guide, Jun. 26, 1997, 223 pages.
Yeung, K., (Thesis) "A Data-Driven Multiprocessor Architecture for High Throughput Digital Signal Processing," Electronics Research Laboratory, U. California Berkeley, Jul. 10, 1995, pp. 1-153.
Yeung, L., et al., "A 2.4GOPS Data-Driven Reconfigurable Multiprocessor IC for DSP," Dept. of EECS, U. California Berkeley, 1995 IEEE International Solid State Circuits Conference, pp. 108-110.
ZILOG Preliminary Product Specification, "Z86C95 CMOS Z8 Digital Signal Processor," 1992, pp. 1-82.
ZILOG Preliminary Product Specification, "Z89120 Z89920 (ROMless) 16-Bit Mixed Signal Processor," 1992, pp. 1-82.
Defendants' Invalidity Contentions in *PACT XPP Technologies, AG v. Xiltnx, Inc., et al.*, (E.D. Texas Dec. 28, 2007) (No. 2:07cv563)., including Exhibits A through K in separate PDF files.
Coelho, F., "Compiling dynamic mappings with array copies," Jul. 1997, 12 pages, http://delivery.acm.org/10.1145/270000/263786/p168-coelho.pdf.
Janssen et al., "A Specification Invariant Technique for Regularity Improvement between Flow-Graph Clusters," Mar. 1996, 6 pages, http://delivery.acm.org/10.1145/790000/787534/74230138.pdf.
Microsoft Press Computer Dictionary, Second Edition, 1994, Microsoft Press, ISBN 1-55615-597-2, p. 10.
Newton, Harry, "Newton's Telecom Dictionary," Ninteenth Edition, 2003, CMP Books, p. 40.
Rehmouni et al., "Formulation and evaluation of scheduling techniques for control flow graphs," Dec. 1995, 6 pages, http://delivery.acm.org/10.1145/230000/224352/p386-rahmouni.pdf.
Sinha et al., "System-dependence-graph-based slicing of programs with arbitrary interprocedural control flow," May 1999, 10 pages, http://delivery.acm.org/10.1145/310000/203675/p432-sinha.pdf.
Stallings, William, "Data & Computer Communications," Sixth Edition, Jun. 2000, Prentice-Hall, Inc., ISBN 0-084370-9, pp. 195-196.
Ramanathan et al., "Reconfigurable Filter Coprocessor Architecture for DSP Applications," Journal of VLSI Signal Processing, 2000, vol. 26, pp. 333-359.
Shanley, Tom, *Pentium Pro and Pentium II System Architecture*, MindShare, Inc., Addition Wesley, 1998, Second Edition, pp. 11-17; Chapter 7; Chapter 10; pp. 209-211, and p. 394.
Shoup, Richard, "Programmable Cellular Logic Arrays," Dissertation, Computer Science Department, Carnegie-Mellon University, Mar. 1970, 193 pages.
Zucker, Daniel F., "A Comparison of Hardware Prefetching Techniques for Multimedia Benchmarks," Technical Report: CSL-TR-95-683, Dec. 1995, 26 pages.

\* cited by examiner

Fig. 3b

| + | - | * | loop 16 | / | + | I/O |
|---|---|---|---------|---|---|-----|
| clk | clk | 2 clk | 16 clk | 32 clk | clk |  |
| 32 | 32 | 16 | 2 | 1 | 32 |  |
| 8 Mhz | 8 Mhz | 16 Mhz | 128 Mhz | 256 Mhz | 8 Mhz | 8 Mhz |
| 4 | 4 | 8 | 64 | 128 | 4 | 2 |
| 1 | 1 | 32 | 16 | 32 | 1 | 1 |

| 0102a I/O | 0102d + | 0102g loop+ |
| 0102b n.c. | 0102e - | 0102h / |
| 0102c n.c. | 0102f * | 0102i + |

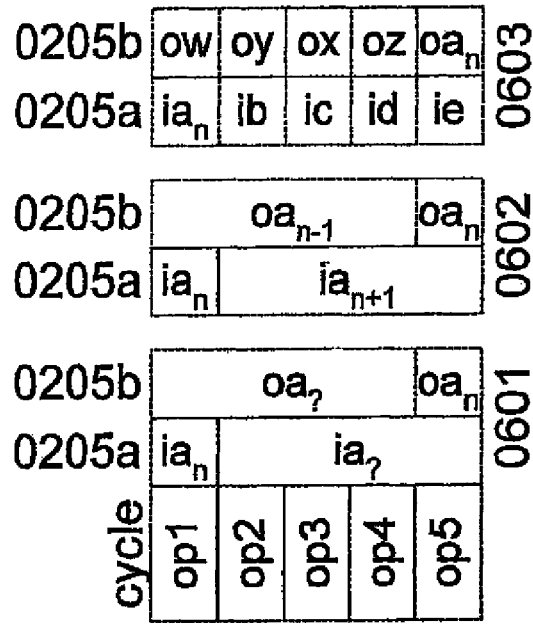
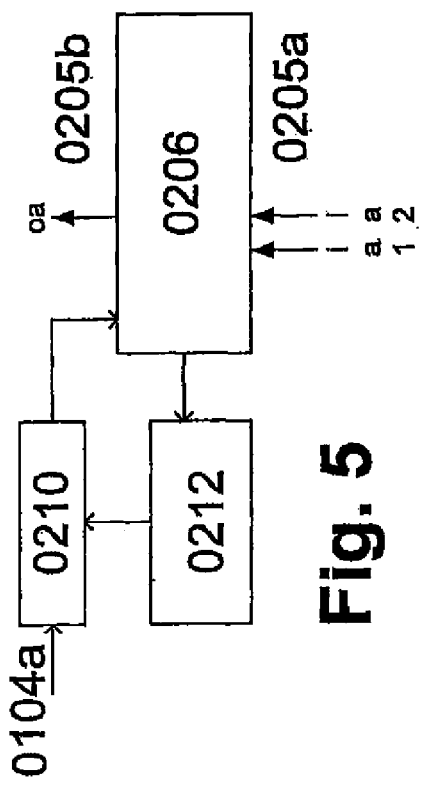
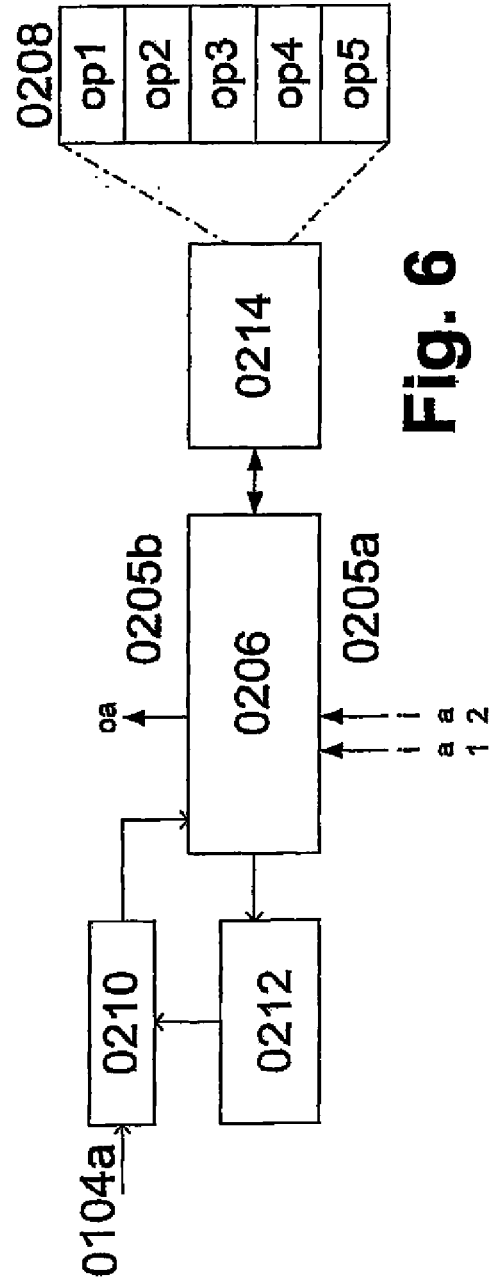
Fig. 6a
Fig. 5
Fig. 6

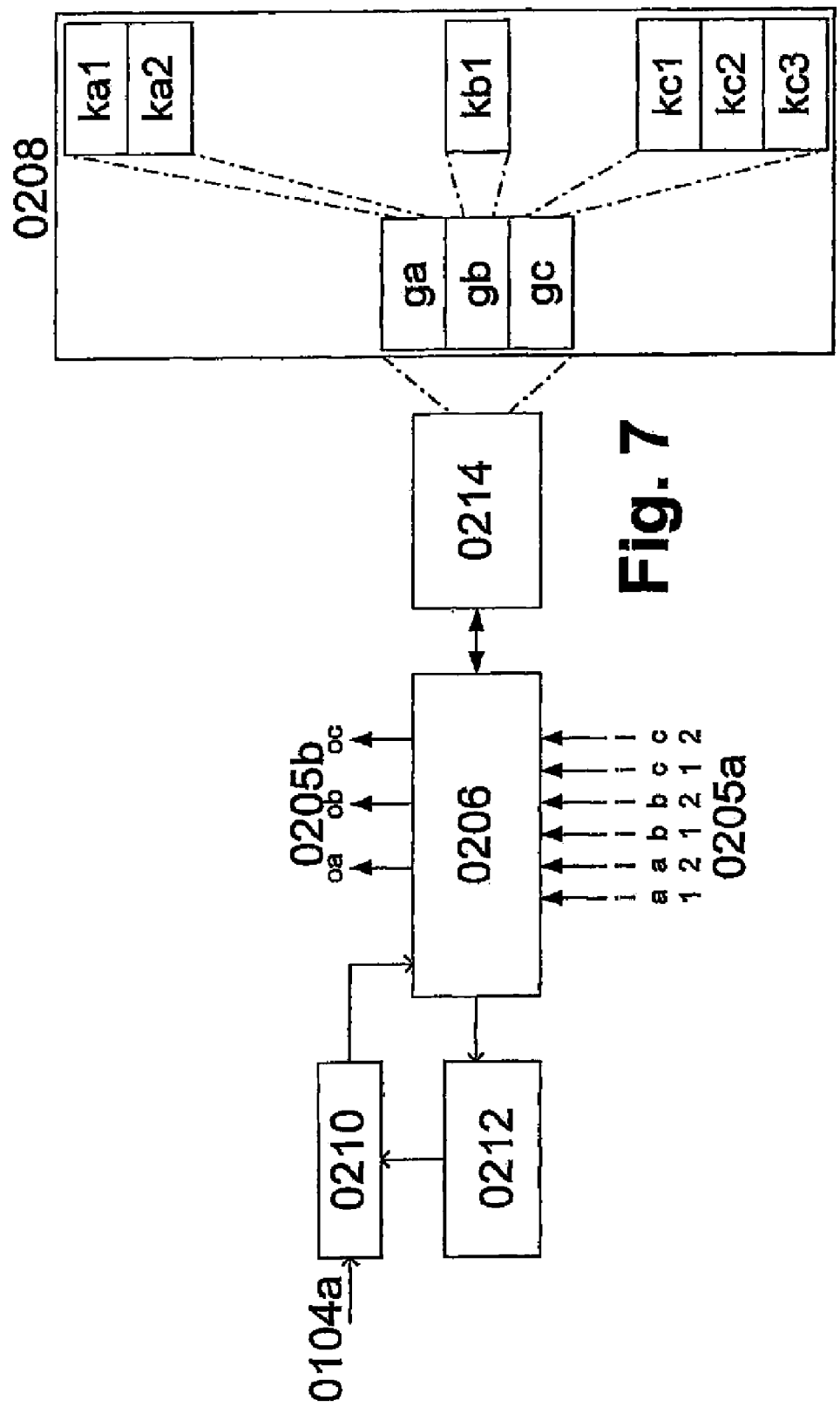

Fig. 7a

| cycle | ka1 | ka2 | kb1 | kc1 | kc2 | kc3 |
|---|---|---|---|---|---|---|

METHODS AND DEVICES FOR TREATING AND PROCESSING DATA

CROSS-REFERENCE TO RELATED APPLICATIONS

This application is a continuation of U.S. patent application Ser. No. 12/257,075, filed on Oct. 23, 2008, now U.S. Pat. No. 8,099,618, which is a divisional of U.S. patent application Ser. No. 10/469,909, filed on Sep. 21, 2004, now U.S. Pat. No. 7,444,531, which is a national phase of International Application Serial No. PCT/EP02/02402, filed on Mar. 5, 2002, which claims priority to German Patent Application Serial No. DE 101 10 530.4, filed on Mar. 5, 2001, the entire contents of each of which are expressly incorporated herein by reference thereto.

FIELD OF THE INVENTION

The present invention relates to optimization of hardware used in data processing.

BACKGROUND INFORMATION

Data processing requires the optimization of the available resources, as well as the power consumption of the circuits involved in data processing. This is the case in particular when reconfigurable processors are used.

Reconfigurable architecture includes modules (VPU) having a configurable function and/or interconnection, in particular integrated modules having a plurality of unidimensionally or multidimensionally positioned arithmetic and/or logic and/or analog and/or storage and/or internally/externally interconnecting modules, which are connected to one another either directly or via a bus system.

These generic modules include in particular systolic arrays, neural networks, multiprocessor systems, processors having a plurality of arithmetic units and/or logic cells and/or communication/peripheral cells (IO), interconnecting and networking modules such as crossbar switches, as well as known modules of the type FPGA, DPGA, Chameleon, XPUTER, etc. Reference is also made in particular in this context to the following patents and patent applications of the same applicant:

P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, PCT/DE 97/02949(PACT02/PCT), PCT/DE 97/02998 (PACT04/PCT), PCT/DE 97/02999 (PACT05/PCT), PCT/DE 98/00334 (PACT08/PCT), PCT/DE 99/00504 (PACT10b/PCT), PCT/DE 99/00505 (PACT10c/PCT), DE 101 39 170.6 (PACT11), DE 101 42 903.7 (PACT11a), DE 101 44 732.9 (PACT11b), DE 101 45 792.8, (PACT11c), DE 101 54 260.7 (PACT11d), DE 102 07 225.6 (PACT11e), PCT/DE 00/01869 (PACT13/PCT), DE 101 42 904.5 (PACT21), DE 101 44 733.7 (PACT21a), DE 101 54 259.3 (PACT21b), DE 102 07 226.4 (PACT21c), PCT/DE 00/01869 (PACT13/PCT), DE 101 10 530.4 (PACT18), DE 101 11 014.6 (PACT18a), DE 101 46 132.1 (PACT18II), DE 102 02 044.2 (PACT19), DE 102 02 175.9 (PACT19a), DE 101 35 210.7 (PACT25), DE 101 35 211.5 (PACT25a), DE 101 42 231.8 (PACT25aII), (PACT25b). The entire contents of these documents are hereby included for the purpose of disclosure.

The above-mentioned architecture is used as an example to illustrate the present invention and is referred to hereinafter as VPU. The architecture includes an arbitrary number of arithmetic, logic (including memory) and/or memory cells and/or networking cells and/or communication/peripheral (IO) cells (PAEs—Processing Array Elements) which may be positioned to form a unidimensional or multidimensional matrix (PA); the matrix may have different cells of any desired configuration. Bus systems are also understood here as cells. A configuration unit (CT) which affects the interconnection and function of the PA through configuration is assigned to the entire matrix or parts thereof. The configuration of a VPU is determined by writing configuration words into configuration registers. Each configuration word determines a subfunction. PAEs may require a plurality of configuration words for their configuration, e.g., one/or more words for the interconnection of the PAE, one/or more words for the clock determination and one/or more words for the selection of an ALU function, etc.

Generally, a processor which is operated at a higher clock frequency requires more power. Thus, the cooling requirements in modern processors increase substantially as the clock frequency increases. Moreover, additional power must be supplied which is critical in mobile applications in particular.

To determine the clock frequency for a microprocessor based on the state is known. Such technologies are known from the area of mobile computers. However, problems arise in the overall speed with which certain applications are carried out.

SUMMARY

An object of the present invention is to provide a novel method for commercial application.

In an example embodiment of the present invention, the power consumption may be reduced and/or optimized in VPU technology. As far as different methods are addressed in the following, it should be pointed out that they provide advantages, either individually or in combination.

In a data processing unit (VPU) according to a first aspect of the present invention, by using a field of clocked logic cells (PAEs) which is operable in different configuration states and a clock preselecting means for preselecting logic cell clocking, the clock preselecting means is designed in such a way that, depending on the state, a first clock is preselected at least at a first cell (PAE) and an additional clock is preselected at least at an additional cell (PAE).

It is therefore suggested to operate different cells using different clocking. As a rule, the additional clock corresponds to the first clock; the former is thus situated in a defined phase angle to the latter. In order to achieve optimum data processing results, in particular with regard to the required data processing time, as well as the power consumption of the entire data processing unit, it is suggested that clocking takes place depending on the state, which means that no clock is preselected jointly for all cells based on a certain state, but rather an appropriate clock is assigned to each cell based on the state.

Furthermore, it is suggested that the clocking be designed to be totally configurable, so that one calibration (configuration) mutually influences the clocking of the total number of cells.

It is possible and desired that the clock preselecting means is designed in such a way that it receives the setpoint clock for at least one first cell from a unit which preselects configuration states. This makes it possible to select the clocking of the cell based on its configuration as soon as this configuration is determined. This has the advantage that configuration may take place free of problems.

The unit preselecting configuration states may be a compiling unit, which means that required or desired clocking of the cell is already determined during the compiling of the program. If the compiling unit preselects the configuration states, then the cell configuration preselecting unit may convey clocking for cell configuration to a cell to be configured. This is advantageous since it is possible to merely add clock-determining information to the configuration word or the configuration instruction with which the configuration of a cell is determined, without additional measures being required such as the implementation of clock-assigning buses which separately transmit the clock-determining signals, or the like; it should be noted that this is possible in principle.

It may also be provided that the clock preselecting means is designed in such a way that it receives the setpoint clock or a clock-influencing signal from one of the other logic cells, in particular a configurable logic cell. This is particularly advantageous if a first logic cell awaits an input signal from an external unit and not until arrival of such signals are the cells to be activated which process subsequently arriving signals. This makes it possible to implement a logic field sleeping mode in which only one or a plurality of cells are activated, if necessary, on a very low level, i.e., very slow clocking, and the remaining field is clocked extremely slowly. The clock frequencies required in the remaining field are dependent on physically necessary clocking which is required for the preservation of memory contents or the like.

It is also advantageous to receive a clock-influencing signal from another logic cell if, using one logic cell, one or a series of a plurality of different arithmetic and/or logical operations may be executed which, at least in part, require a different number of clock cycles, but this may not be determined in advance by the compiling unit. Also in such a case, the subsequent cells do not need to be operated at a high clock frequency if they are appropriately clocked down by corresponding signals which indicate the state of the cell participating in a processing sequence.

In a preferred variant, the clock preselecting means includes a central clock preselecting unit, e.g., a central clock generator, whose clock is transmitted to the individual cells via a clock line, as well as a local clock-generating unit for generating a local clock from and/or in response to the central clock transmitted via the clock line. In a possible embodiment, clocking of the central clock preselecting unit may be set or influenced by a configuration. The local clock-generating unit is preferably implemented by using a frequency divider and/or a frequency multiplier, and the frequency divider ratio is preferably determined by the preselections of the clock preselecting means according to the clock determination based on the state.

In a preferred variant, the logic cells or at least some of the logic cells include at least one ALU and/or are formed by such. It is possible and preferred if some of the logic cells contain at least one memory unit and/or register unit which may be assigned to the remaining logic cells. In particular, this unit may be provided for data to be processed and/or for configurations of the cell.

It is possible that a plurality of logic cells are identical and are operated using different clocking corresponding to their particular configuration. It is possible in particular that all logic cells are identical.

A method is also provided for operating a field of clocked logic cells which may be set into different configuration states, a first state being determined, at least temporarily, for at least one first cell, a clock which is to be assigned to the first cell being determined dependent on the first state and the cell being operated using this clock; a second state is determined for at least one additional cell, a second clock which is to be assigned to the second cell being determined dependent on the second state and the second cell being operated using the second clock which differs from the first clock.

As mentioned above, clocking may be preselected together with the configuration. The state is then the configuration state and/or is at least determined by it.

In known and configurable logic cells, cells are typically combined in groups for executing complex operations. If individual cells execute suboperations which run in fewer clock cycles as is the case with those cells which are [engaged] in particularly drawn-out suboperations of the complex total operations executed by the group, it is preferred if these cells are operated at different clock rates, namely in such a way that the cells for less complex operations, thus operations which run in fewer clock cycles, are clocked slower than the other cells; it is preferred in particular if the cells of one group are clocked collectively in such a way that the number of blank cycles within the group is minimized. An alternative and/or an addition to this lies in the fact of temporarily changing the use of cells burdened with less complex tasks for a certain number of clock cycles, thus changing the use during a fixed number of clock cycles.

In particular, the case may occur that the maximum clock cycle rate of PAEs and/or PAE groups is limited by their function and in particular by their interconnection. The propagation time of signals via bus systems plays an increasingly frequency-limiting role, in particular in advancing semiconductor technology. Henceforth, the method allows slower clocking of such PAEs and/or PAE groups, while other PAEs and/or PAE groups operate at a different and, if needed, higher frequency. It is suggested in a simplified embodiment to make the clock rate of the entire reconfigurable module (VPU) dependent on the maximum clock rate of the slowest PAE and/or PAE group. In other words, the central clock preselecting unit may be configured in such a way that the highest mutual operating clock of all PAEs and/or PAE groups (in other words the smallest common denominator of all maximum clock rates) is globally generated for all PAEs.

The above-described method is particularly advantageous if the cells of the group process data sequentially, i.e., the result determined by one cell is passed on to one or multiple cells which are subsequently processing data.

It should be noted that in addition to prioritizing tasks within the cell field for clock preselection, the condition of a power source may also be included in cell clocking determination. Clocking may be reduced overall in the case of a drop in supply voltage, in particular in mobile applications. Clocking-down for preventing an over temperature by responding to a temperature sensor signal or the like is equally possible. It is also possible for the user to preset the clock preselection. Different parameters may jointly establish the clock-determining state.

It was mentioned above that it is possible to perform time division multiplexing for carrying out multiple configurations on the same PAE. A preferred and enhanced design makes particularly resource-saving time division multiplexing for carrying out multiple configurations on the same PAE possible; the design may have advantages independently from the different clocking of individual cells, e.g., when latencies have to be taken into account which occur in the signal transmission of digital data via a bus, such as configuration data, data to be processed, or the like. These problems are particularly serious when reconfigurable modules, having reconfigurable units which are located in part comparatively far apart from one another, are to be operated at high clock frequencies. The problem arises here that due to the special configuration of VPUs, a plurality of arbitrary PAEs is connected via buses and considerable data transmission traffic exists via the buses. The switching frequency of transistors is expected to further increase in modern and above all in future silicon technologies, while the signal transmission via buses is to increasingly become a performance-limiting factor. It is therefore suggested to decouple the data rate or frequency on the buses vis-a-vis the operating frequency of the data-processing PAEs.

A particularly simple embodiment, preferred for simple implementations, operates in such a way that the clock rate of a VPU is only globally settable. In other words, a settable clock may be preselected for all PAEs or it may be configured by a higher-level configuration unit (CT). All parameters which have an effect on clocking determine this one global clock. Such parameters may be, for example, a temperature determination, a power reserve measurement of batteries, etc.

A determining parameter may be in particular the maximum operating frequency of the slowest configuration which results as a function of a PAE configuration or a configuration of a group of PAEs. Since different configurations may include different numbers of PAEs over stretches of bus connections of different lengths, it was realized, in particular in bus signal transmission-limiting applications, that configurations may have different maximum frequencies. Configurations may have different maximum frequencies, as is known from FPGAs, for example, which depend on the particular function of the PAEs and in particular on the lengths of bus connections. The slowest configuration then ensures that the proper operation of this configuration is also ensured, and simultaneously reduces the power demand of all other configurations which is advantageous in particular when different portions of the data processing such as through the other configurations, which would possibly run at higher clock frequencies, are not needed prior to the slowest configuration. Also in cases where it must be absolutely ensured that proper operation takes place, the possibly only negligible performance loss occurring by clocking-down other configurations, which could run faster per se, is often acceptable.

In an optimized embodiment, the frequency is adapted only to the configurations which are currently carried out on a VPU, in other words, the global frequency may be reset/reconfigured with each configuration.

In an enhanced embodiment, the clock may then be configured globally, as well as, as described above, individually for each configurable element.

It should be noted that different variants are possible, individually or in combination. In order to show a detailed example, it is assumed in the following, without this necessarily being the case, that the clock may be controlled individually in each PAE. This offers the following possibilities, for example:

a) Controlled Enabling and Disabling of the Clock

It is preferred that the processing clock of PAEs is disabled, i.e., the PAEs operate only in case of need; clock enabling, i.e., activating the PAE, may take place, for example, under at least one of the following conditions, namely
when valid data is present; when the result of the previous computation is approved; due to one or more trigger signals; due to an expected or valid timing mark, compare DE 101 10 530.4 (PACT18).

In order to cause clock enabling, each individual condition may be used either individually or in combination with other conditions, clock enabling being computed based on the logical combination of conditions. It should be noted that it is possible to put the PAEs into a power-saving operating mode while a clock is disabled, for example, through additionally partly switched-off or reduced power supply, or, should it be necessary because of other reasons, through extremely reduced sleeping clocks.

b) Different Frequencies Per PAE

Technologies for controlling sequences in VPUs are known from PCT/DE 97/02949 (PACT02/PCT), PCT/DE 97/02998 (PACT04/PCT), and PCT/DE 00/01869 (PACT13/PCT). Special sequencers (SWTs) which control a large number of PAEs and which are responsible for their (re)configuration are configured in PCT/DE 97/02998 (PACT04/PCT). The (re)configuration is controlled by using status signals which are generated by the PAEs (triggers) and passed on to the SWTs, namely in that the SWT responds to the triggers, making the particular continuation of a sequence dependent on the triggers.

A small memory for their configuration is assigned to each individual PAE in PCT/DE 97/02949 (PACT02/PCT). A sequencer passes through the memory and addresses the individual configurations. The sequencer is controlled by triggers and/or by the status of its PAE (into which it may be integrated, for example).

During data processing, it is now possible that different sequencers in different PAEs have to carry out a different number of operations per transmitted data packet (compare DE 101 39 170.6 (PACT11), DE 101 42 903.7 (PACT11a), DE 101 44 732.9 (PACT11b), DE 101 45 792.8 (PACT11c), DE 101 54 260.7 (PACT11d), DE 102 07 225.6 (PACT11e), PCT/DE 00/01869 (PACT13/PCT)). This is described using a configuration as an example in which 3 sequencers are involved in processing a data packet, requiring a different number of operations for data packet processing. Example:

Sequencer 1 (Seq1) requires 10 operations for processing a data packet,

Sequencer 2 (Seq2) requires 5 operations for processing a data packet,

Sequencer 3 (Seq3) requires 20 operations for processing a data packet.

In order to obtain an optimum operation/power consumption ratio, the individual sequencers would have to be clocked as follows:

$$F\max=F_{Seq2}/4=F_{Seq1}/2=F_{Seq3}$$

or at a maximum operating frequency of, for example, 100 MHz: $F_{seq1}$=50 MHz, $F_{seq2}$=25 MHz, $F_{seq3}$=100 MHz.

It is suggested in particular to use different clock sources for each PAE and/or group of PAEs. For example, different techniques may be used for this purpose, either individually or jointly:

1) Clock dividers, individually programmable per PAE, which enable an individually configurable divider ratio based on one or more mutual base clocks.
2) Clock multipliers (PLLs), individually programmable per PAE, which enable an individually configurable divider ratio based on one or more mutual base clocks.
3) Deriving the particular PAE clock from the data stream of the particular data to be processed, e.g., by oversampling.

An exemplary embodiment having different algorithms is illustrated in FIG. 1.

c) Configuration Clock

Optimization of the power consumption is also favored in that the circuit components, necessary for executing a configuration, are clocked selectively, i.e., it is suggested to clock each PAE addressed and/or to completely disable the clock of those circuit components necessary for executing a configuration or a reconfiguration when no configuration or reconfiguration is being executed and/or to use static registers.

In particular example embodiments, the operating frequency of the PAEs or groups of PAEs may be made dependent on different and/or additional factors. The following is listed below as an example:

1. Temperature Measurement

If the operating temperature reaches certain threshold values, the operating clock is reduced correspondingly. The reduction may take place selectively by initially operating those PAEs on a lower clock which represent the most irrelevant performance loss.

In a particularly preferred embodiment, multiple temperature measurements may be performed in different regions and clocking may be adapted locally.

2. Buffer Filling Levels

IO-FIFOs (input-output-first-in-first-out-circuits) which decouple peripheral data transmissions from data processing within a VPU are described in DE 102 06 653.1 (PACT15), DE 102 07 224.8 (PACT15a), (PACT15b). One buffer for input data (input buffer) and/or one buffer for output data (output buffer) may be implemented, for example. A particularly efficient variable for determining the clock frequency may, for example, be determined from the filling level of the particular data buffers. The following effects and measures may occur, for example:

a) An input buffer is largely full and/or the filling level rises abruptly: Clocking increase to accelerate processing.
b) An input buffer is largely empty and/or the filling level drops abruptly: Clocking decrease to decelerate processing.
c) An output buffer is largely full and/or the filling level rises abruptly: Clocking decrease to decelerate processing.
d) An output buffer is largely empty and/or the filling level drops abruptly: Clocking increase to accelerate processing.

Depending on the application and the system, suitable combinations may be implemented accordingly.

It should be pointed out that such a clock frequency determination is implementable if a filling level determination means for a buffer, in particular an input and/or output buffer, alternatively also an intermediate buffer within a VPU array, is provided and if this filling level determination means is connected to a clock preselecting means for preselecting logic cell clocking so that this clock preselecting means is able to change the logic cell clocking in response to the buffer filling level.

3. Battery Charge State

It is imperative to be careful with the power supply, e.g., a battery, for mobile units. Depending on the power reserve, which may be determined based on the existing methods according to the related art, the frequency of PAEs and/or groups of PAEs is determined and is reduced in particular when the power reserve is low.

Besides or in addition to optimizing data processing clocking it is also possible to accomplish an optimization of the data transmission with respect to the relationship between data transmission and data processing.

In a particular embodiment, the clock controls of PAEs described may be enhanced in such a way that, by using a sequencer-like activation and a suitable register set, for example, multiple, preferably different, configuration words may be executed successively in multiple clocks. A sequencer, sequentially processing a number of configuration inputs, may be additionally assigned to the configuration registers and/or to a configuration memory which is possibly also decoupled and implemented separately (compare DE 102 06 653.1 (PACT15), DE 102 07 224.8 (PACT15a, PACT15b). The sequencer may be designed as a microcontroller. In particular, the sequencer may be programmable/configurable in its function such as Altera's module EPS448 (ALTERA Data Book 1993). Possible embodiments of such PAEs are described, for example, in the following patent applications which are included in their entirety for the purpose of disclosure: PCT/DE 97/02949 (PACT02/PCT), PCT/DE 97/02998 (PACT04/PCT), PCT/DE 00/01869 (PACT13/PCT), DE 101 10 530.4 (PACT18), DE 102 06 653.1 (PACT15), DE 102 07 224.8 (PACT15a, PACT 15b).

For the following, it is initially assumed that multiple configuration words are combined into one configuration (PACKEDCONF) and are configured on a PAE. The PACKEDCONF is processed in such a way that the individual configuration words are executed in chronological succession. The data exchange and/or status exchange between the individual timed configurations takes place via a suitable data feedback in the PAEs; for example by using a suitable register set and/or another data exchange and/or status/exchange means such as suitable memories and the like.

This method allows a different timing for PAEs and bus systems. While PAEs process data at very high clock rates, for example, operands and/or results are transmitted via a bus at only a fraction of the clock rate of the PAEs. The transmission time via a bus may be correspondingly longer.

It is preferred if not only the PAEs or other logic units in a configurable and/or reconfigurable module are clockable at a different rate, but also if different clocking is provided for parts of a bus system. It is possible here to provide multiple buses in parallel whose speed is clocked differently, i.e., a bus which is clocked particularly high for providing a high-performance connection, parallel to a bus which is clocked lower for providing a power-saving connection. The connection clocked high may be used when longer signal paths have to be compensated, or when PAEs, positioned close together, operate at a high frequency and therefore also have to exchange data at a high frequency in order to provide a good transmission here over short distances in which the latency plays a minor role at best. Therefore, it is suggested in a possible embodiment that a number of PAEs, positioned together locally and combined in a group, operate at a high frequency and possibly also sequentially and that local and correspondingly short bus systems are clocked high corresponding to the data processing rate of the group, while the bus systems, inputting the operands and outputting the results, have slower clock and data transmission rates. For the purpose of optimizing the power consumption, it would be alternatively possible to implement slow clocking and to supply data at a high speed, e.g., when a large quantity of inflowing data may be processed with only a minor operational effort, thus at low clock rates.

In addition to the possibility of providing bus systems which are clocked using different frequencies it is also possible to provide multiple bus systems which are operable independently from one another and to then apply the PAEs in a multiplex-like manner as required. This alone makes it possible to operate reconfigurable modules particularly efficiently in resource multiplexing, independently from the still existing possibility of differently clocking different bus systems or different bus system parts. It is possible here to assign different configurations to different resources according to different multiplexing methods.

According to PCT/DE 00/01869 (PACT13/PCT), a group of PAEs may be designed as a processor in particular.

In the following embodiments, for example, different configurations are assigned to data-processing PAEs using time-division multiplexing, while bus systems are assigned to the different configurations using space-division multiplexing.

In the assignment of resources, i.e., the assignment of tasks to PAEs or a group of PAEs to be carried out by the compiler or a similar unit, the given field may then be considered as a field of the n-fold variable and code sections may be transferred to this field of resources, which is virtually scaled up by the factor n, without the occurrence of problems, particularly when code sections are transferred in such a way that no interdependent code sections have to be configured into a PAE which is used in a multiplex-like manner.

In the previous approach, a PACKEDCONF was composed of at least one configuration word or a bundle of configuration words for PAEs which belong to one single application. In other words, only configuration words which belong together were combined in the PACKEDCONF.

In an enhanced embodiment, at least one or more configuration words per each different configuration are entered into a PACKEDCONF in such a way that the configuration word or words which belong together in a configuration are combined in a configuration group and the configuration groups thus created are combined in the PACKEDCONF.

The individual configuration groups may be executed in chronological succession, thus in time-division multiplexing by a timeslice-like assignment. This results in time division multiplexing of different configuration groups on one PAE. As described above, the configuration word or the configuration words within a configuration group may also be executed in chronological succession.

Multiplexers which select one of the configuration groups are assigned to the configuration registers and/or to a configuration memory, which is possibly also decoupled and implemented separately (compare DE 102 06 653.1 (PACT15), DE 102 07 224.8 (PACT15a, PACT 15b)). In an enhanced embodiment, a sequencer (as described above) may be additionally assigned which makes the sequential processing of configuration words within configuration groups possible.

Using the multiplexers and the optional sequencer, a resource (PAE) may be assigned to multiple different configurations in a time-division multiplex method.

Among one another, different resources may synchronize the particular configuration group to be applied, for example by transmitting a configuration group number or a pointer.

The execution of the configuration groups may take place linearly in succession and/or cyclically, with a priority being observed. It should be noted here in particular that different sequences may be processed in a single processor element and that different bus systems may be provided at the same time so that no time is wasted in establishing a bus connection which may take some time due to the long transmission paths. If a PAE assigns its first configuration to a first bus system and, on execution of the first configuration, couples the same to the bus system, then it may, in a second configuration, couple a different or partially different bus system to the former if spacial multiplexing for the bus system is possible.

The execution of a configuration group, each configuration group being composed of one or more configuration words, may be made dependent on the reception of an execution release via data and/or triggers and/or an execution release condition.

If the execute release (condition) for a configuration group is not given, the execute release (condition) may either be awaited, or the execution of a subsequent configuration group may be continued. The PAEs preferably go into a power-saving operating mode during the wait for an execute release (condition), for example with a disabled clock (gated clock) and/or partially disabled or reduced power supply. If a configuration group cannot be activated, then, as mentioned above, the PAEs preferably also go into a power-saving mode.

The storage of the PACKEDCONF may take place by using a ring-type memory or other memory or register means, the use of a ring-type memory resulting in the fact that after the execution of the last input, the execution of the first input may be started again (compare PCT/DE 97/02998 (PACT04/PCT)). It should be noted that it is also possible to skip to a particular execution directly and/or indirectly and/or conditionally within the PACKEDCONF and/or a configuration group.

In a preferred method, PAEs may be designed for processing of configurations in a corresponding time-division multiplexing method. The number of bus systems between the PAEs is increased such that sufficient resources are available for a sufficient number of configuration groups. In other words, the data-processing PAEs operate in a time-division multiplex method, while the data-transmitting and/or data-storing resources are adequately available.

This represents a type of space division multiplexing, a first bus system being assigned to a first temporarily processed configuration, and a second bus system being assigned to an additional configuration; the second bus system runs or is routed spacially separated from the first bus system.

It is possible at the same time and/or alternatively that the bus systems are also entirely or partially operated in time-division multiplexing and that multiple configuration groups share one bus system. It may be provided here that each configuration group transmits its data as a data packet, for example, a configuration group ID being assigned to the data packet (compare APID in DE 102 06 653.1 (PACT15), DE 102 07 224.8 (PACT 15a, PACT 15b)). Subsequently it may be provided to store and sort the particular data packets transmitted based on their assigned identification data, namely between different buses if required and for coordinating the IDs.

In an enhanced method, memory sources may also be run in a time-division multiplex, e.g., by implementing multiple segments and/or, at a change of the configuration group, by writing the particular memory/memories as described in PCT/DE 97/02998 (PACT04/PCT) and/or PCT/DE 00/01869 (PACT13/PCT) into a different or even external memory or by loading from the same. In particular the methods as described in DE 102 06 653.1 (PACT15), DE 102 07 224.8 (PACT15a, PACT 15b) may be used (e.g., MMU paging and/or APID).

The adaptation of the operating voltage to the clock should be noted as a further possibility for conserving resources.

Semiconductor processes typically allow higher clock frequencies when they are operated at higher operating voltages. However, this causes substantially higher power consumption and may also reduce the service life of a semiconductor.

An optimum compromise may be achieved in that the voltage supply is made dependent on the clock frequency. Low clock frequencies may be operated at a low supply voltage, for example. With increasing clock frequencies, the supply voltage is also increased (preferably up to a defined maximum).

BRIEF DESCRIPTION OF THE DRAWINGS

FIG. 3a shows a 3×3 field of configurable cells.
FIG. 3b shows a table indicating numbers of clock cycles and clock rates for the cells of FIG. 3a.

FIG. 5 shows an example embodiment of the operation of a PAE according to FIG. 2.

FIG. 6 shows an example embodiment of the operation of a PAE, including activation of a sequencer.

FIG. 6a shows an example of the transmission of data on a data bus.

FIG. 7 shows an example embodiment of the operation of a PAE, in which multiple configuration groups share the PAE.

FIG. 7a shows example bus transmission in accordance with FIG. 7.

DETAILED DESCRIPTION OF EXAMPLE EMBODIMENTS

The present invention, as an example, is explained in greater detail below with reference to the Figures. It should be noted that this exemplary description is not limiting and that in isolated cases and in different figures identical or similar units may be denoted using different reference numbers.

Figure 1:
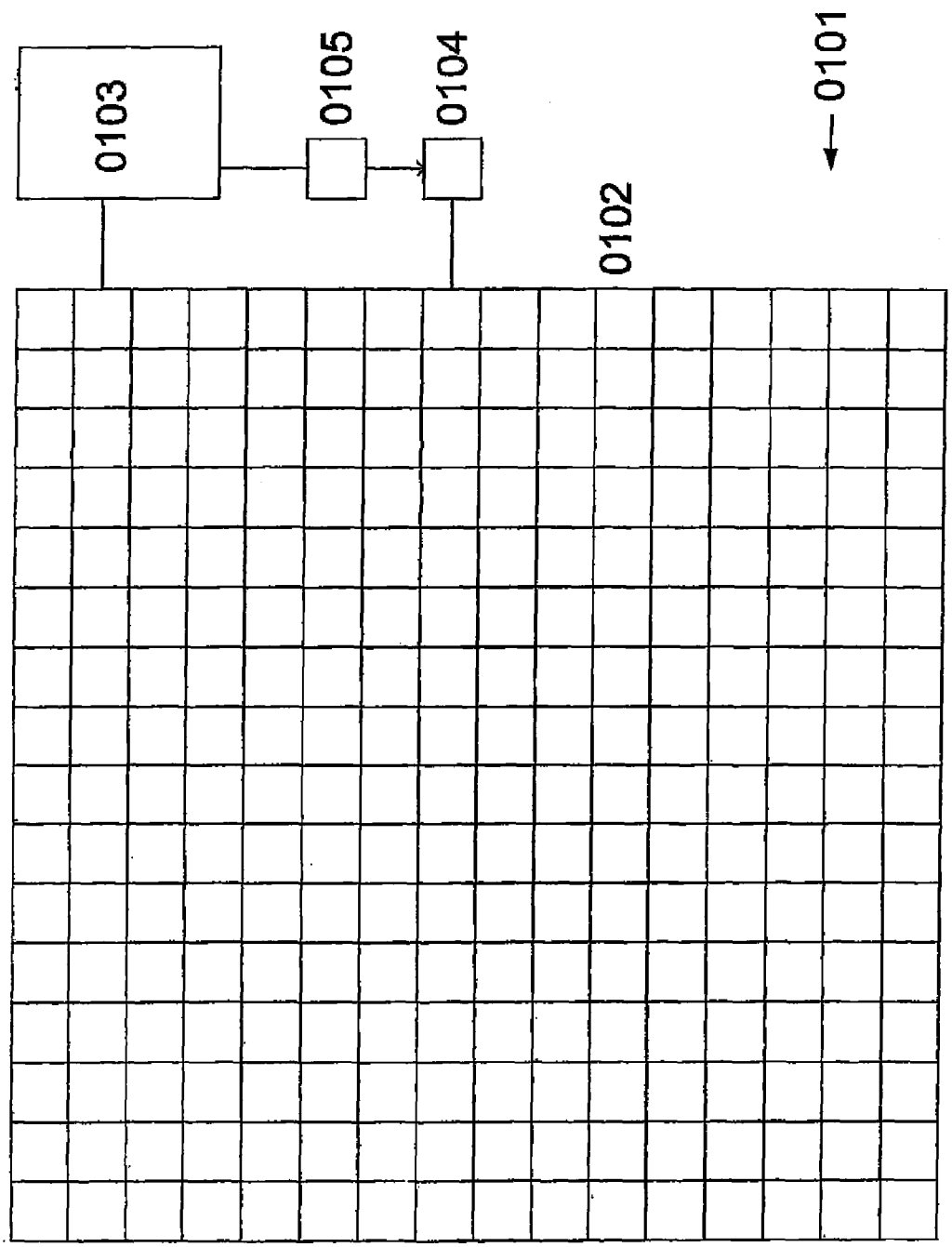
FIG. 1 shows a reconfigurable data processing unit.

As an example, FIG. 1 shows a reconfigurable data processing unit (VPU) (0101). A configuration unit (CT, 0103) for the control and execution of the configuration and reconfiguration is superordinated to an array of PAEs (0102) which are configurable and reconfigurable independently from one another. In this connection, particular reference is made to the various applications of the applicant and the disclosure content of the patents and technologies described above. In addition, a central clock generator (0104) is assigned to the data processing unit. In a possible embodiment, the clock rate of the central clock generator may be preselected by configuration unit 0103. In a possible embodiment, the clock rate of each PAE and/or groups of PAEs and their bus connections may also be preselected by configuration unit 0103.

Figure 2:
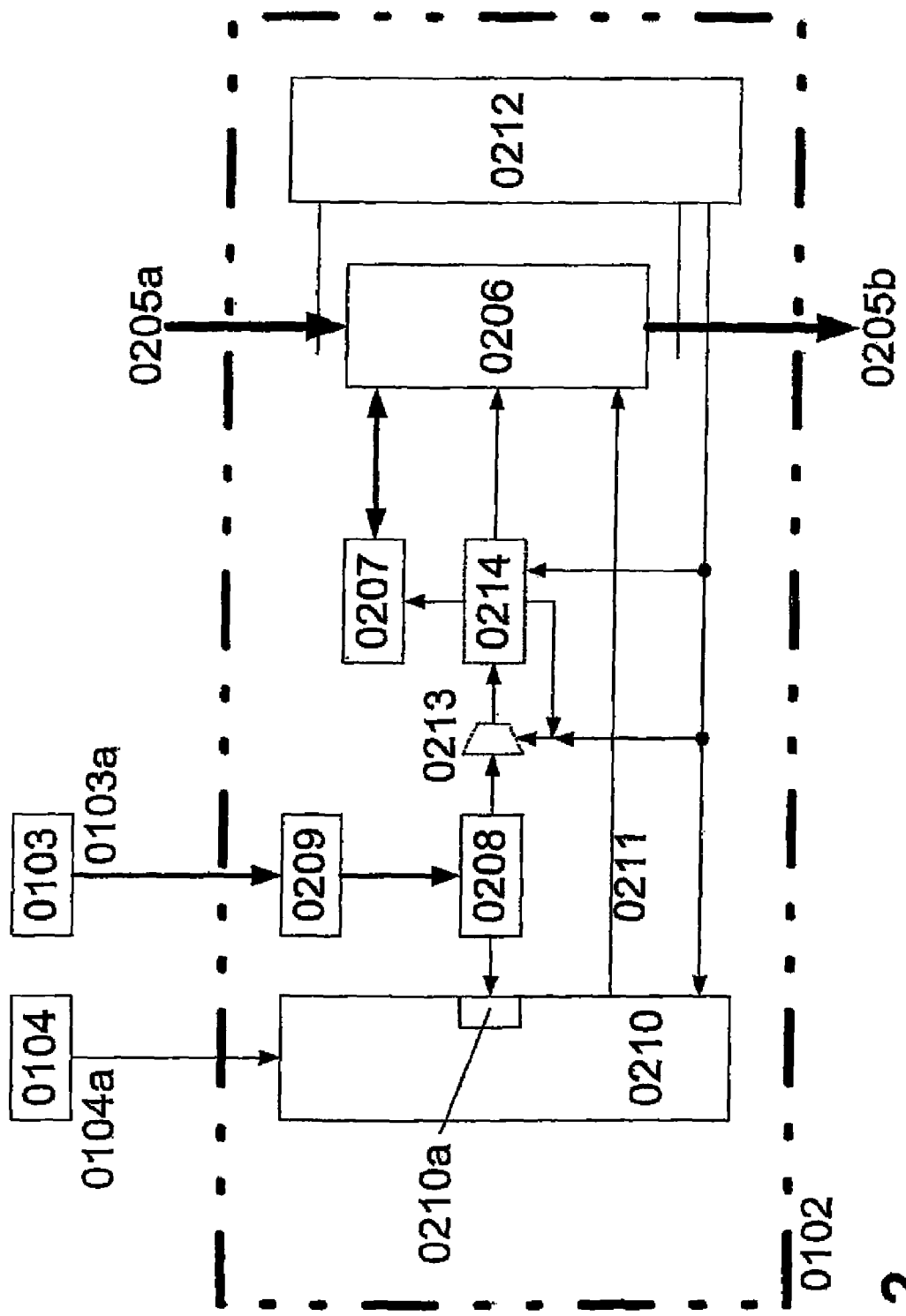
FIG. 2 shows a configuration unit feeding configuring data via a configuration line into a respective cell.

According to FIG. 2, configuration unit 0103 feeds configuring data via a configuration line 0103a into respective cells 0102 of which only one is illustrated as an example. Furthermore, the clock signal of central clock generator 0104 is fed to cell 0102 via a clock line 0104a. Via a data bus input 0205a and a data bus output 0205b, reconfigurable cell 0102 communicates with other cells and additionally has a data processing unit, e.g., an arithmetic logic unit ALU 0206, and preferably an internal data memory 0207 and a configuration memory 0208 into which configuring instructions from configuration unit 0103 are fed via a configuration instruction extractor 0209 in order to configure the data processing unit, e.g., ALU 0206, as a response. In addition, configuration (instruction) extractor 0209 is connected to a frequency divider/multiplier factor preselecting input 0210a of a frequency divider/frequency multiplier 0210 which is designed to divide or multiply the clock signal of central clock generator 0104 on clock line 0104a according to a clock ratio preselected via input 0210a and to feed the clock signal to the data processing unit, e.g., arithmetic logic unit ALU 0206, and possibly other units of reconfigurable cell 0102 via a line 0211. Using an optional data bus monitoring circuit 0212, 0210 may be activated in such a way that the frequency is controlled depending on the data reception or the data transmission.

Furthermore, a multiplexer 0213 for selecting different configurations and/or configuration groups may optionally be integrated dependent on 0212. Furthermore, the multiplexer may optionally be activated by a sequencer 0214 in order to make sequential data processing possible. In particular, intermediate results may be managed in data memory 0207.

While the general configuration of the cell was described in part in the applicant's applications described above, the presently described clock dividing system, the associated circuit, and the optimization of its operation are at least novel and it should be pointed out that these facts may and shall be associated with the required hardware changes.

The entire system and in particular configuration unit 0103 is designed in such a way that, together with a configuring signal with which a configuration word is fed via configuration line 0103a via configuration word extractor 0209 to data processing unit 0206 or upstream and/or downstream and/or associated memory 0208, a clock dividing/multiplying signal may also be transmitted which is extracted by configuration word extractor 0209 and transmitted to frequency divider/multiplier 0210, so that, as a response, 0210 may clock data processing unit 0206 and possibly also other units. It should be pointed out that, as a response to an input signal to the cell, there are also other possibilities instead of unit 0209 to vary clocking of an individual data processing unit 0206 with reference to a central clock unit 0104, via data bus monitoring circuit 0212, for example.

Figure 4:
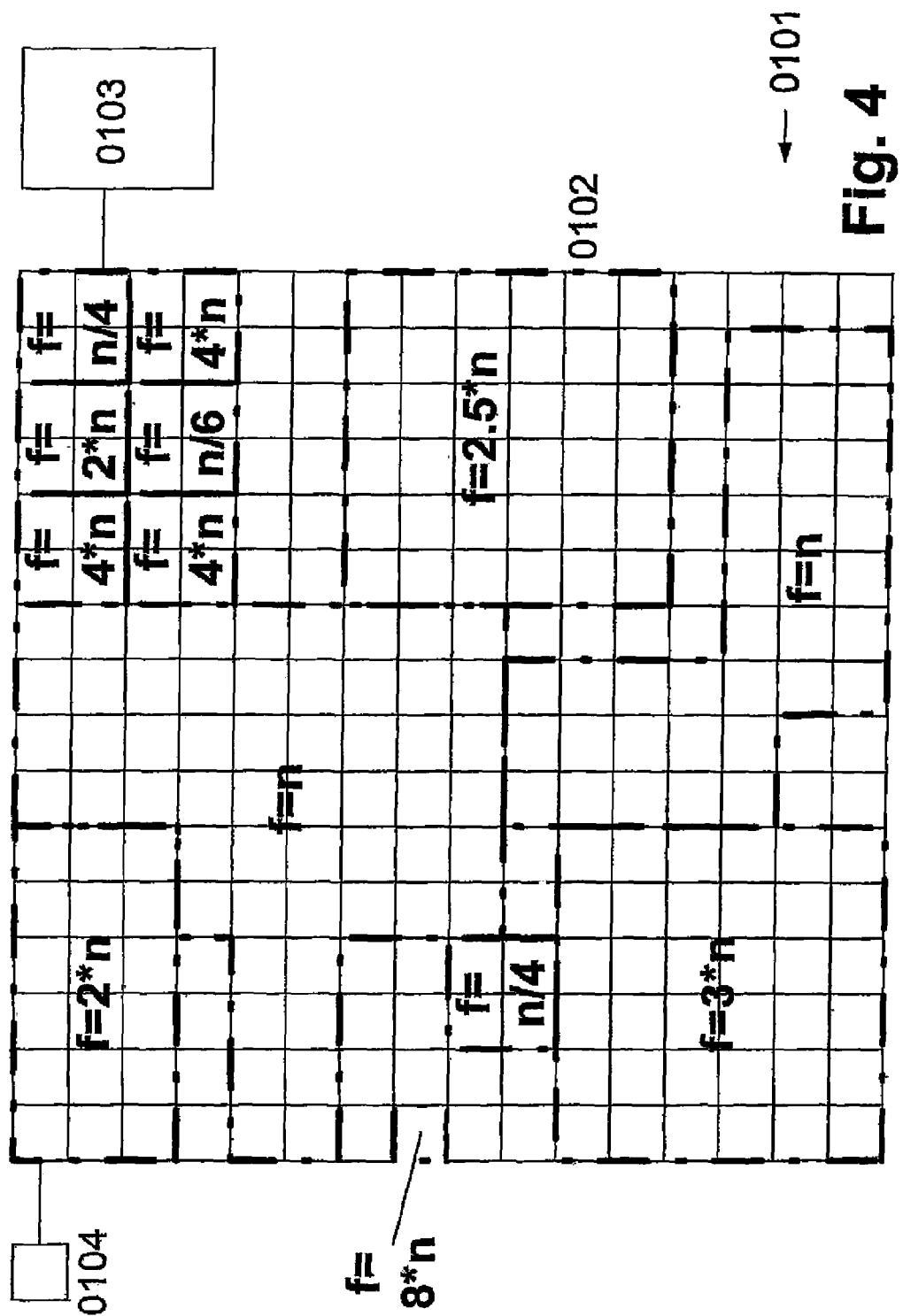
FIG. 4 shows the data processing unit (VPU) according to FIG. 1.

Described only as an example with reference to FIGS. 3 and 4, an entire field of all reconfigurable logic units 0102 may be operated using the above-described embodiment, but possibly also by implementing the units in a different way.

For example, a 3×3 field of reconfigurable cells is configured in such a way, according to FIG. 3a, that a first cell 0102a is used for analyzing an input/output signal. Cells 0102b, 0102c are presently not needed and are therefore denoted as not configured (n. c.). Cells 0102d through 0102i together form a group which executes a complex arithmetic operation; an addition takes place in cell 0102d, a subtraction takes place in cell 0102e, a multiplication takes place in cell 0102f, a loop is run in cell 0102g, a multiple addition being executed within the loop, a division takes place in cell 0102h, and an addition in turn takes place in cell 0102i. Cells 0102d through 0102i are connected to one another in group 0301, indicated by dot and dash lines, in such a way that data is sequentially and pipeline-like processed by the cells. As is indicated in the second row of the table in FIG. 3b, the operations within cells 0102d and 0102e are executed in a different number of clock cycles. The number of clock cycles is denoted there and it is clear that an addition or a subtraction may be executed in one clock cycle; the division, however, requires 32 clock cycles. The third line of the table in FIG. 3b denotes which value is assigned to the frequency divider of each cell in order to achieve optimum power usage at a constant data throughput through the cell. Only the cell in which the division takes place is operated at the highest clock; the clock ratio here is 1. This cell requires the longest time for the operation assigned to it. Since a new result has to be delivered only every 32 clock pulses to cell 0102h executing the division, cells 0102d and 0102e are clocked slower by the appropriate factor of 32; the frequency divider ratio for these cells is therefore 32, as can be seen in FIG. 3b. The multiplication running in two clock cycles has a frequency divider ratio of 16, and the more complex loop of cell 0102g running in 16 clock cycles is assigned a frequency divider ratio of only 2. These clock ratios are initially known at the configuration, in which the individual cells are compiled in groups and are assigned to each cell within the group since they were determined by the compiler at program compilation and may therefore be input into the cell at its configuration. It is denoted in the fourth row from the top which clock rate results from a central clock of 256 MHz.

If the processor unit having the separately clockable reconfigurable logic cells is operated in an application where the voltage may drop, e.g., due to exhausting voltage supply capacities, it may be provided that, at a drop in the supply voltage, the entire frequency is reduced to a critical value U1; all cells are subsequently clocked slower by one half so that division cell 0102*h* too runs only at 128 MHz, while cell 0102*d* is clocked at 4 MHz. Cell 0102*a*, executing a query of the mouse pointer having a lower priority, is no longer clocked at 8 MHz as previously but rather at 2 MHz, i.e., depending on the prioritization, different slowdowns according to the importance of the task are assigned to the respective groups at a voltage drop or under other circumstances.

If, for other reasons, the temperature still rises, the heat generation in the logic cell field may be further reduced by an additional clock rate reduction for the logic cells, as is indicated in the last row of FIG. 3*b*. It is understood that, for example, a particular individual sensor for determining the condition such as the supply voltage and/or the temperature may be provided whose sensor signal is fed to the cells in a conditioned manner; a corresponding sensor system may be assigned to each cell and/or the central clock is possibly modifiable.

This makes it possible to optimally operate a processor field energy-efficiently; the cooling capacity required is reduced and it is clear that, since as a rule not all cells may and/or must be permanently operated at the highest clock frequency, heat sinks and the like may be dimensioned appropriately smaller which in turn offers additional cost advantages.

It should be noted that in addition to the query regarding a supply voltage, a temperature, the prioritization of computations, and the like, other conditions may determine the clock. For example, a hardware switch or a software switch may be provided with which the user indicates that only low clocking or higher clocking is desired. This makes an even more economical and targeted handling of the available power possible. It may be provided in particular that, at the user's request or at an external request, the central clock rate in total may be reduced; the clock divider ratios within the cell array, however, are not changed in order to avoid the requirement of reconfiguring all cells, e.g., at an extreme temperature rise. Moreover, it should be pointed out that a hysteresis characteristic may be provided in determining the clock rates, when a temperature-sensitive change of the clock frequencies is to be performed, for example.

FIG. 4 shows the data processing unit (VPU) according to FIG. 1. Different groups within the VPU are operated using different frequencies f which are derived from a frequency normal n generated by 0104. It should be expressly noted that multiple frequency normals ($n_1 \ldots n_n$) may be generated by multiple 0104 and may be used within one VPU.

FIG. 5 shows a simple exemplary embodiment for the operation of a PAE according to FIG. 2. A data bus (0205*a*) delivers operands ia1 and ia2 to an ALU (0206) which in turn delivers the result of the computation oa to 0205*b*. The PAE is only activated, i.e., clocked and/or supplied with current, when data bus monitoring circuit 0212 recognizes the acceptance of the previous result oa by the receiver and the arrival of operands ia1 and ia2 necessary for the operation. In other words, the PAE is only activated when all working conditions and requirements are met. The clock release is carried out by 0210, the clock source is 0104*a*.

FIG. 6 corresponds to FIG. 5 with the exception that a sequencer (0214) is additionally activated which controls a multicyclical configuration (e.g., a complex computation such as a matrix multiplication or the like). The sequencer extracts the operations from the configuration memory or from a section of the configuration memory. In the example shown, operations op1, op2, op3, op4, op5 are carried out sequentially. Result oa is conveyed after completion and the PAE has to be activated again.

The data transmission occurring on data bus 0205*a/b* is illustrated in FIG. 6*a*. It should be pointed out that the data routing via the bus may take place in a conventional manner, i.e., collision and deadlock situations may be prevented for one configuration at a time in a conventional manner.

In order to execute op1, operands ia must be available via 0205*a* (0601); the data transmissions for the remaining cycles may be undefined in principle.

Thereafter, 0205*a* may preferably transmit the subsequent operands (0602) for which the execution time of op2, op3, op4, op5 is available, thus creating a temporal decoupling, allowing the use of slower and/or, in particular, longer bus systems.

During the execution of op2, op3, op4, op5, data of other configurations may alternatively (0603) be transmitted via the same bus system 0205*a* using a time-division multiplex method.

Following op5, result oa is applied to bus 0205*b* (0601); the data transmissions for the remaining cycles may be undefined in principle.

The time prior to op5, i.e., during the execution of op1, op2, op3, op4, may be used for transmitting the previous result (0602). This again creates a temporal decoupling, allowing the use of slower and/or, in particular, longer bus systems.

During the execution of op1, op2, op3, op4, data of other configurations may alternatively (0603) be transmitted via the same bus system 0205*b* using a time-division multiplex method. For clock multiplication, 0210 may use a PLL. A PLL may be used in particular in such a way that the operating clock of the PAE for executing op1, op2, op3, op4, op5 is five times that of the bus clock. In this case, the PAE may act as a PAE without a sequencer having only one (unicyclical) configuration and the same clock as the bus clock.

FIG. 7 corresponds to FIG. 6 plus the addition that multiple configuration groups (ga, gb, gc) share the PAE in a time-division multiplexed manner and each group has connections to a-separate (space-division multiplexed) bus system (ia/oa, ib/ob, ic/oc). A multiplexer in 0214 cyclically selects the groups ga, gb, gc. Provided the data monitoring circuit 0212 generates a valid execution release (condition) for a configuration group, the particular configuration group is executed; otherwise the execution release (condition) may be awaited or, preferably, a different subsequent configuration group may be selected. The configuration groups may be run through cyclically.

One configuration group may contain multiple configuration words (ga={ka1, ka2}, gb={kb1}, gc={kc1, kc2, kc3}). The configuration words may be executed sequentially in 0214 using a sequencer.

Figure 7A:
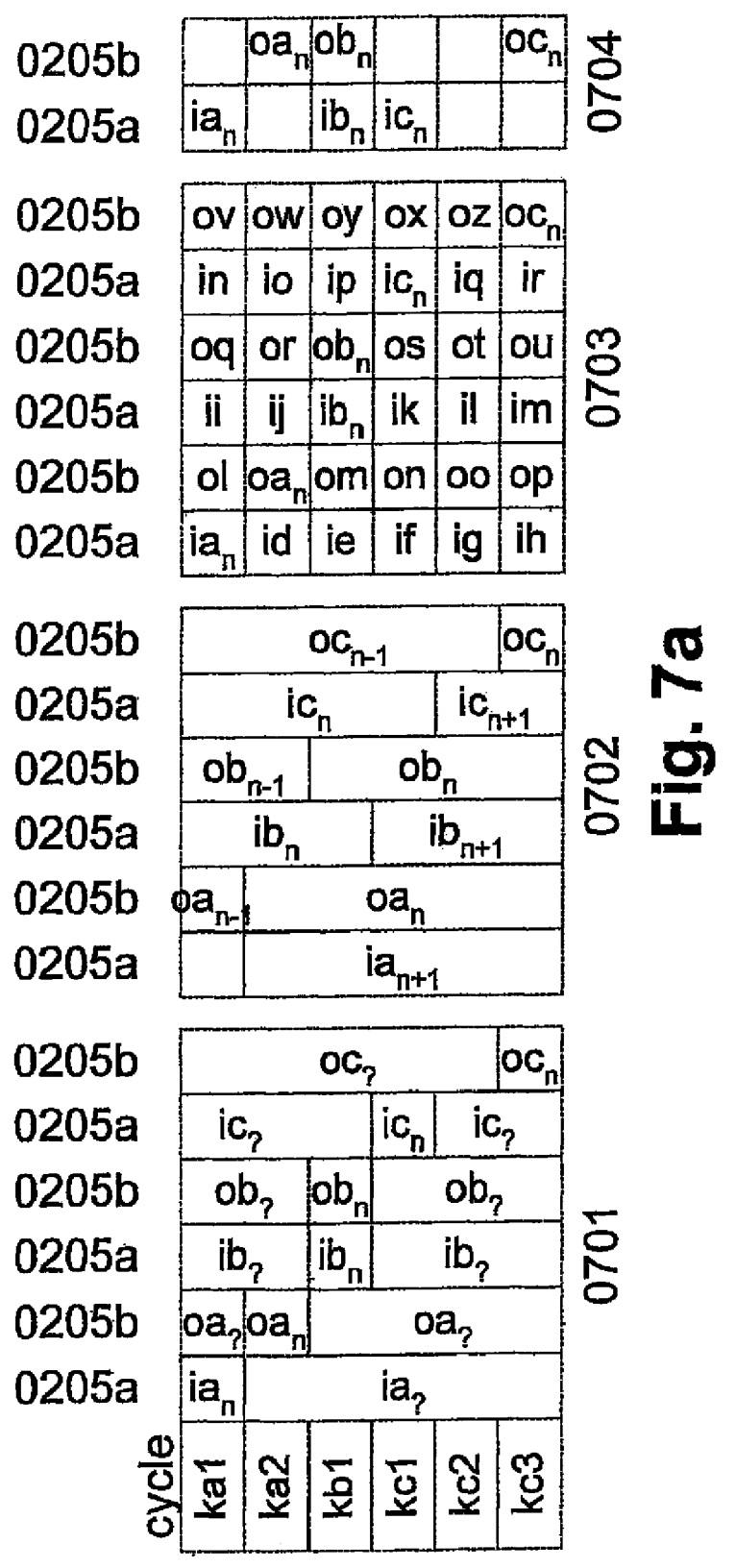

FIG. 7*a* shows the bus transmissions according to the example in FIG. 7. 0701 corresponds to 0601, 0702 corresponds to 0602, 0703 corresponds to 0603; a separate bus system is used thereby for each group ga, gb, gc.

In addition, a possible bus transmission using a time-division multiplex for the bus systems is illustrated in 0704. The input data of all groups is transmitted via an input bus system and the output data of all groups is transmitted via an output bus system. The undefined intermediate cycles are either unused or are free for other data transmissions.

What is claimed is:

1. A method of operating a system comprising a plurality of data processing elements adapted for programmably processing sequences and to which tasks are assigned, the tasks including at least one task having a first complexity and at least one task of less complexity than the first complexity, the method comprising:

assigning the tasks for processing in a multiplexed manner such that the tasks are independent from each other, wherein certain of said elements are operational and process data only in case of requirement;

temporarily using one or more elements, having a workload due to an assignment of one or more of the tasks of less complexity than the first complexity, in a manner other than that which is for performing the one or more of the tasks of less complexity than the first complexity, the temporarily using being by temporarily assigning to the elements one or more different tasks; and down-clocking currently unused data processing elements, such that the currently unused data processing elements are supplied with a clock rate maximally serving the preservation of memory contents.

2. The method according to claim 1, wherein the down-clocking depends on the amount of data to be processed.

3. A method of operating a system having a plurality of data processing elements adapted for programmably processing sequences, to which tasks are assigned, and which are operable at different clock frequencies, the method comprising:

grouping, by execution of software for managing distribution of code, a plurality of subsets of processing elements into processing element groups;

effecting a plurality of temperature measurements in different regions of the system; and based on the temperature measurement, a control circuit modifying clock rates of the plurality of subsets of processing elements, wherein the clock rates set in the modifying step are set on a processing element group basis.

4. The method according to claim 3, wherein the system is an integrated circuit.

5. The method according to claim 4, wherein the integrated circuit is a processor.

6. A processor device, comprising:

a plurality of data processing elements adapted for programmably processing sequences and to which tasks are assigned, each of the data processing elements having at least one Arithmetic Logic Unit, and at least some of the data processing elements being adapted to operate at different clock frequencies that are adapted locally depending on a plurality of temperature measurements at different regions of the processor device;

wherein a plurality of subsets of the data processing elements are grouped, by execution of software for managing distribution of code, into processing element groups, and the clock frequencies set for the data processing elements responsive to the temperature measurements are set on a processing element group basis, so that, for each of the groups, the clock frequency of the data processing elements of the group are modified in a same manner.

7. The processor device according to claim any one of claims 6, wherein the processor device is an integrated circuit.

8. A processor device, comprising a plurality of data processing elements adapted for programmably processing sequences and to which tasks are assigned, each of the data processing elements having at least one Arithmetic Logic Unit; and at least one bus system at least one of (a) interconnecting at least some of the data processing elements and (b) connecting at least some of the data processing elements with at least one of peripherals and external memory;

wherein:

each of at least some of the data processing elements is capable of operating at a clock frequency different than at least one other of the data processing elements; and the processor device is adapted for reducing clock frequencies of the data processing elements in response to a determination that a power reserve of a battery is below a predetermined threshold.

9. The processor device according to claim 8, wherein at least some of the data processing elements have at least one locally connected memory for storing processing data.

10. A processor device, comprising:

a plurality of data processing elements; and a software adapted to be executed to (a) manage distribution of code sections, each code section to be executed by a respective group of a subset of the plurality of data processing elements, and (b) assign to each of the code sections a respective clock frequency, the group of data processing elements executing the respective code sections at the respective clock frequencies.

11. The processor device according to claim 8, wherein the clock frequency for at least some of the data processing elements is determined by at least one other of the data processing elements.

12. A processor device, comprising:

a plurality of data processing elements adapted for programmably processing sequences and to which tasks are assigned, each of the data processing elements having at least one Arithmetic Logic Unit; and at least one bus system at least one of (a) interconnecting at least some of the data processing elements and (b) connecting at least some of the data processing elements with at least one of peripherals and external memory;

wherein:

each of at least some of the data processing elements is capable of operating at a clock frequency different than at least one other of the data processing elements;

the clock frequency of each of the data processing elements is at least determinable by a state of the processing device; and the clock frequency for at least some of the data processing elements is set in accordance with a supply voltage.

13. The processor device according to any one of the claims 8, 10, and 11, further comprising:

an arrangement for individually defining a power supply for at least one of the data processing elements depending on the clock frequency of the at least one of the data processing elements.

14. The processor device according to any one of the claims 8, 10, and 11, further comprising:

an arrangement for disabling a clock of at least some data processing elements at runtime; and an arrangement for individually defining a power supply for at least one of the processing elements depending on the clock frequency of the at least one of the data processing elements.

15. The processor device according to claim 8, wherein a power supply voltage of each of at least some of the data processing elements is set depending on the clock frequency of the data processing elements.

16. The processor device according to any one of the claims 8, 10, 11, 12, and 15, wherein different parameters jointly establish the clock frequency of at least one of the data processing elements.

17. The processor device according to any one of the claims 8, 10, 11, 12, and 15, further comprising:
an arrangement for disabling a clock of at least some data processing elements at runtime.

18. The processor device according to claim 8, wherein a clock frequency of at least one of the data processing elements is reduced dynamically for preventing overheating of a chip.

19. The processor device according to claim 18, wherein the clock frequency is determined in response to a temperature sensor.

20. The processor device according to claim 8, wherein a frequency of the bus system is set independently from the frequency of the processor elements.

21. A processor device, comprising:
a plurality of data processing elements adapted such that, in response to a state in which the plurality of data processing elements are waiting for an input from an external element, at least one of the data processing elements enters a first sleep mode at a first clock frequency and the remaining data processing elements enter a second sleep mode at a second clock frequency that is slower than the first clock frequency; wherein the at least one of the data processing elements triggers the plurality of data processing elements to wake up from the sleep modes and operate at a third clock frequency that is faster than the first and second clock frequencies in response to receipt by the at least one data processing element of the input.

22. The processor device according to claim 21, further comprising a power saving arrangement for reducing the power supply of least the data processing elements operating at the first and second clock frequencies.

23. A processor device, comprising:
a plurality of data processing elements adapted for programmably processing sequences and to which tasks are assigned, each of the data processing elements having at least one Arithmetic Logic Unit; and
at least one bus system at least one of (a) interconnecting at least some of the data processing elements and (b) connecting at least some of the data processing elements with at least one of peripherals and external memory;
wherein:
each of at least some of the data processing elements is capable of operating at a clock frequency different than at least one other of the data processing elements;
the clock frequency of each of the data processing elements is at least determinable by a state of the processing device; and
the clock frequency of at least some of the data processing elements is determined by a fill level of at least one of an input data buffer and an output data buffer.

24. A processor device, comprising:
a plurality of data processing elements adapted for programmably processing sequences and to which tasks are assigned, each of the data processing elements having at least one Arithmetic Logic Unit; and
at least one bus system at least one of (a) interconnecting at least some of the data processing elements and (b) connecting at least some of the data processing elements with at least one of peripherals and external memory;
wherein:
each of at least some of the data processing elements is capable of operating at a clock frequency different than at least one other of the data processing elements;
the clock frequency of each of the data processing elements is at least determinable by a state of the processing device; and
the clock frequency of at least some of the data processing elements is set based on whether data is determined to be available.

25. The processor device according to claim 8, further comprising at least one central clock, wherein the clock frequency of each of at least some of the data processing elements is derived from the at least one central clock 26. The processor device according to claim 25, wherein at least some of the data processing elements have at least one locally connected memory for storing processing data.

27. The processor device according to claim 10, further comprising at least one central clock, wherein the clock frequency of each of at least some of the data processing elements is derived from the at least one central clock.

28. The processor device according to claim 11, further comprising at least one central clock, wherein the clock frequency of each of at least some of the data processing elements is derived from the at least one central clock.

29. The processor device according to claim 12, further comprising at least one central clock, wherein the clock frequency of each of at least some of the data processing elements is derived from the at least one central clock.

30. The processor device according to claim 13, further comprising at least one central clock, wherein the clock frequency of each of at least some of the data processing elements is derived from the at least one central clock.

31. The processor device according to claim 14, further comprising at least one central clock, wherein the clock frequency of each of at least some of the data processing elements is derived from the at least one central clock.

32. The processor device according to claim 25, wherein a power supply voltage of each of at least some of the data processing elements is set depending on the clock frequency of the data processing elements.

33. The processor device according to claim 16, further comprising at least one central clock, wherein the clock frequency of each of at least some of the data processing elements is derived from the at least one central clock.

34. The processor device according to claim 17, further comprising at least one central clock, wherein the clock frequency of each of at least some of the data processing elements is derived from the at least one central clock.

35. The processor device according to claim 25, wherein a clock frequency of at least one of the data processing elements is reduced dynamically for preventing overheating of a chip.

36. The processor device according to claim 35, wherein the clock frequency is determined in response to a temperature sensor.

37. The processor device according to claim 25, wherein a frequency of the bus system is set independently from the frequency of the processor elements.

38. The processor device according to claim 21, further comprising at least one central clock, wherein clock frequency of each of at least some of the data processing elements is derived from the at least one central clock.

39. The processor device according to claim 38, further comprising a power saving arrangement for reducing the power supply of least the data processing elements operating at the first and second clock frequencies.

40. The processor device according to claim 23, further comprising at least one central clock, wherein the clock frequency of each of at least some of the data processing elements is derived from the at least one central clock.

41. The processor device according to claim 24, further comprising at least one central clock, wherein the clock frequency of each of at least some of the data processing elements is derived from the at least one central clock.

42. A processor device comprising:
- a plurality of data processing elements that are dynamically grouped into a plurality of groups of subsets of the plurality of data processing elements during runtime, such that a group to which one or more of the plurality of data processing elements is assigned changes during runtime;
- a temperature measuring element; and
- a clock frequency control circuit that is adapted for independently setting respective clock frequencies of the data processing elements on a group by group basis according to a grouping prevailing when the setting is performed.

43. The processor device according to claim 42, wherein the data processing elements are runtime configurable data processing elements according to a plurality of configurations, wherein the configurations define the groupings of the data processing elements.

44. The processor device according to claim 10, wherein the plurality of data processing elements are runtime configurable, and the code sections are configurations of respective groups of the plurality of data processing elements.

* * * * *